US010488089B2

(12) United States Patent
Kester et al.

(10) Patent No.: US 10,488,089 B2
(45) Date of Patent: Nov. 26, 2019

(54) PARALLEL CAPILLARY EXPANSION TUBE SYSTEMS AND METHODS

(71) Applicant: Johnson Controls Technology Company, Milwaukee, WI (US)

(72) Inventors: Douglas A. Kester, York, PA (US); Curtis W. Caskey, Dallastown, PA (US); James K. Spitzer, York, PA (US); Chandra Yelamanchili, York, PA (US); Nicholas P. Mislak, Bel Air, MD (US); Rajiv K. Karkhanis, York, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 16 days.

(21) Appl. No.: 15/718,282

(22) Filed: Sep. 28, 2017

(65) Prior Publication Data

US 2018/0094841 A1 Apr. 5, 2018

Related U.S. Application Data

(60) Provisional application No. 62/404,675, filed on Oct. 5, 2016.

(51) Int. Cl.
*F25B 41/06* (2006.01)
*F25B 49/02* (2006.01)
(Continued)

(52) U.S. Cl.
CPC ............ *F25B 41/062* (2013.01); *F25B 39/00* (2013.01); *F25B 40/02* (2013.01); *F25B 41/067* (2013.01);
(Continued)

(58) Field of Classification Search
CPC ........ F25B 5/02; F25B 39/028; F25B 41/067; F25B 2600/2513; F25B 2700/13
See application file for complete search history.

(56) References Cited

U.S. PATENT DOCUMENTS 2,220,831 A * 11/1940 Swart .................... F25B 39/028
137/109
2,432,859 A * 12/1947 Carter ................... F25B 39/028
137/110
(Continued)

FOREIGN PATENT DOCUMENTS

EP 1953480 A1 8/2008
WO 2004111558 A1 12/2004

OTHER PUBLICATIONS

Zhenying Zhang et al., "Choked Flow Characteristics of Subcritical Refrigerant Flowing Through Converging-Diverging Nozzles", Entropy, Nov. 4, 2014, pp. 5810-5821, 16, Switzerland.

*Primary Examiner* — Jonathan Bradford
(74) *Attorney, Agent, or Firm* — Fletcher Yoder, P.C.

(57) ABSTRACT

A cooling system includes an expansion valve configured to exert a first pressure drop on refrigerant circulated through the cooling system. The cooling system also includes a plurality of capillary expansion tubes fluidly coupled in parallel to an output of the expansion valve and configured to exert a second pressure drop on the refrigerant circulated through the cooling system. The cooling system also includes a controller communicatively coupled to the expansion valve, wherein the controller is configured to control magnitude of the first pressure drop by instructing the expansion valve to adjust the valve position based at least in part on refrigerant mass flow expected to be supplied to the expansion valve to facilitate substantially uniformly distributing the refrigerant mass flow between each of the plurality capillary expansion tubes.

21 Claims, 10 Drawing Sheets

(51) Int. Cl.
  *F25B 43/00*  (2006.01)
  *F25B 39/00*  (2006.01)
  *F25B 40/02*  (2006.01)
  *F25B 39/02*  (2006.01)

(52) U.S. Cl.
  CPC .......... F25B 43/006 (2013.01); F25B 49/022 (2013.01); *F25B 39/028* (2013.01); *F25B 2341/062* (2013.01); *F25B 2341/0683* (2013.01); *F25B 2600/0253* (2013.01); *F25B 2600/2513* (2013.01); *F25B 2700/13* (2013.01); *F25B 2700/197* (2013.01); *F25B 2700/21175* (2013.01)

(56) References Cited

U.S. PATENT DOCUMENTS

| | | | |
|---|---|---|---|
| 3,120,743 A * | 2/1964 | Wilson | F25B 39/028 62/504 |
| 4,373,353 A | 2/1983 | Anzalone | |
| 5,113,668 A | 5/1992 | Wachs, III et al. | |
| 5,285,649 A * | 2/1994 | Yamanaka | B60H 1/3208 123/339.17 |
| 5,386,709 A | 2/1995 | Aaron | |
| 5,632,154 A * | 5/1997 | Sibik | F25B 41/062 165/292 |
| 5,758,506 A * | 6/1998 | Hancock | B60H 1/00585 62/149 |
| 6,351,950 B1 | 3/2002 | Duncan | |
| 6,708,511 B2 | 3/2004 | Martin | |
| 7,086,249 B2 | 8/2006 | Bae et al. | |
| 7,290,402 B1 * | 11/2007 | Bailey | F25B 41/062 236/92 B |
| 8,235,101 B2 | 8/2012 | Taras et al. | |
| 8,763,424 B1 | 7/2014 | Albertson | |
| 2003/0213251 A1 | 11/2003 | Hofmann | |
| 2008/0190134 A1 | 8/2008 | Khatib et al. | |
| 2008/0307810 A1 * | 12/2008 | VanderZee | F25B 49/02 62/222 |
| 2015/0000332 A1 | 1/2015 | Michitsuji et al. | |
| 2015/0362222 A1 * | 12/2015 | Matsuda | F25B 39/028 62/324.1 |

* cited by examiner

PARALLEL CAPILLARY EXPANSION TUBE SYSTEMS AND METHODS

CROSS REFERENCE TO RELATED APPLICATIONS

This application is a Non-Provisional application claiming priority from and the benefit of U.S. Provisional Application Ser. No. 62/404,675, filed Oct. 5, 2016, entitled "COOLING SYSTEM WITH MULTIPLE PARALLEL CAPILLARY EXPANDERS," which is hereby incorporated by reference in its entirety for all purposes.

BACKGROUND

The present disclosure generally relates to cooling systems and, more particularly, to capillary expansion tubes implemented in cooling systems.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Generally, heat exchangers may be implemented in cooling systems, such as air conditioning systems, chiller systems, refrigeration systems, and/or the like. In operation, a heat exchanger may facilitate energy (e.g., heat) exchange between a circulated refrigerant (e.g., coolant) and a surrounding fluid (e.g., water or air). In particular, while circulated in the cooling system, the refrigerant may be cycled through various phases. For example, in a condenser heat exchanger, the refrigerant may enter a condenser coil as a vapor, condense, and exit the condenser coil as a liquid. Additionally, in an evaporator heat exchanger, the refrigerant may enter an evaporator coil as a liquid, evaporate (e.g., vaporize), and exit the evaporator coil as a vapor (e.g., gas).

While some energy exchange may result due to temperature difference (e.g., sensible heat), much more of the energy exchange between the fluid and the refrigerant in a heat exchanger may occur due to phase change (e.g., latent heat) of the refrigerant. For example, in an evaporator heat exchanger, phase change of the refrigerant from a liquid phase to a gas phase may extract heat from air flowing around the evaporator coil, thereby cooling the air. Generally, heat extraction efficiency of a heat exchanger may be dependent at least in part on refrigerant mass flow distribution in the heat exchanger and/or the cooling system. However, in some instances, refrigerant mass flow in a cooling system may be affected by operational parameters of the cooling system, such as operating capacity of a compressor, air flow distribution across the evaporator, variability in flow resistance between parallel refrigerant flow paths through the evaporator. Additionally or alternatively, refrigerant mass flow in a cooling system may be affected by implementation of the cooling system, such as implementation of an evaporator heat exchanger and/or implementation of an expansion device that supplies refrigerant to the evaporator heat exchanger.

SUMMARY

Certain embodiments commensurate in scope with the originally claimed embodiments are summarized below. These embodiments are not intended to limit the scope of the claimed embodiments, but rather these embodiments are intended only to provide a brief summary of possible forms of the embodiments. Indeed, the embodiments may encompass a variety of forms that may be similar to or different from the embodiments set forth below.

In a first embodiment, a cooling system includes an expansion valve configured to exert a first pressure drop on refrigerant circulated through the cooling system. The cooling system also includes a plurality of capillary expansion tubes fluidly coupled in parallel to an output of the expansion valve and configured to exert a second pressure drop on the refrigerant circulated through the cooling system. The cooling system also includes a controller communicatively coupled to the expansion valve, wherein the controller is configured to control magnitude of the first pressure drop by instructing the expansion valve to adjust the valve position based at least in part on refrigerant mass flow expected to be supplied to the expansion valve to facilitate substantially uniformly distributing the refrigerant mass flow between each of the plurality capillary expansion tubes.

In a second embodiment, a method for operating a cooling system includes determining, using a controller of the cooling system, expected mass flow of refrigerant to be supplied to an expansion valve in the cooling as the refrigerant is circulated through the cooling system. The method also includes instructing, using the controller, an actuator of the expansion valve to maintain valve position at a first open position greater than or equal to a threshold position to produce a first pressure drop across the expansion valve that facilitates substantially uniformly dividing the refrigerant output from the expansion valve between a plurality of parallel capillary expansion tubes when the expected mass flow of refrigerant is greater than or equal to a threshold mass flow. The method also includes instructing, using the controller, the actuator to adjust the valve position from the first open position to a second open position less than the threshold position to produce a second pressure drop across the expansion valve that facilitates substantially uniformly dividing the refrigerant output from the expansion valve between the plurality of parallel capillary expansion tubes when the expected mass flow of refrigerant is less than the threshold mass flow, wherein the second pressure drop is greater than the first pressure drop.

In a third embodiment, a tangible, non-transitory, computer-readable media that stores instructions executable by one or more processors in a cooling system. The instructions include instructions to determine, using the one or more processors, expected mass flow of refrigerant to be supplied to an expansion valve in the cooling as the refrigerant is circulated through the cooling system. The instructions also include instructions to instruct, using the one or more processors, an actuator of the expansion valve to maintain valve position at a first open position greater than or equal to a threshold position to produce a first pressure drop across the expansion valve with a first magnitude that facilitates substantially uniformly dividing the refrigerant output from the expansion valve between a plurality of parallel capillary expansion tubes when the expected mass flow of refrigerant is greater than or equal to a threshold mass flow. The instructions also include instructions to instruct, using the using the one or more processors, the actuator to adjust the valve position from the first open position to a second open position less than the threshold position to produce the first pressure drop across the expansion valve with a second magnitude that facilitates substantially uniformly dividing the refrigerant output from the expansion valve between the plurality of parallel capillary expansion tubes when the expected mass flow of refrigerant is less than the threshold mass flow, wherein the second magnitude is greater than the first magnitude.

DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
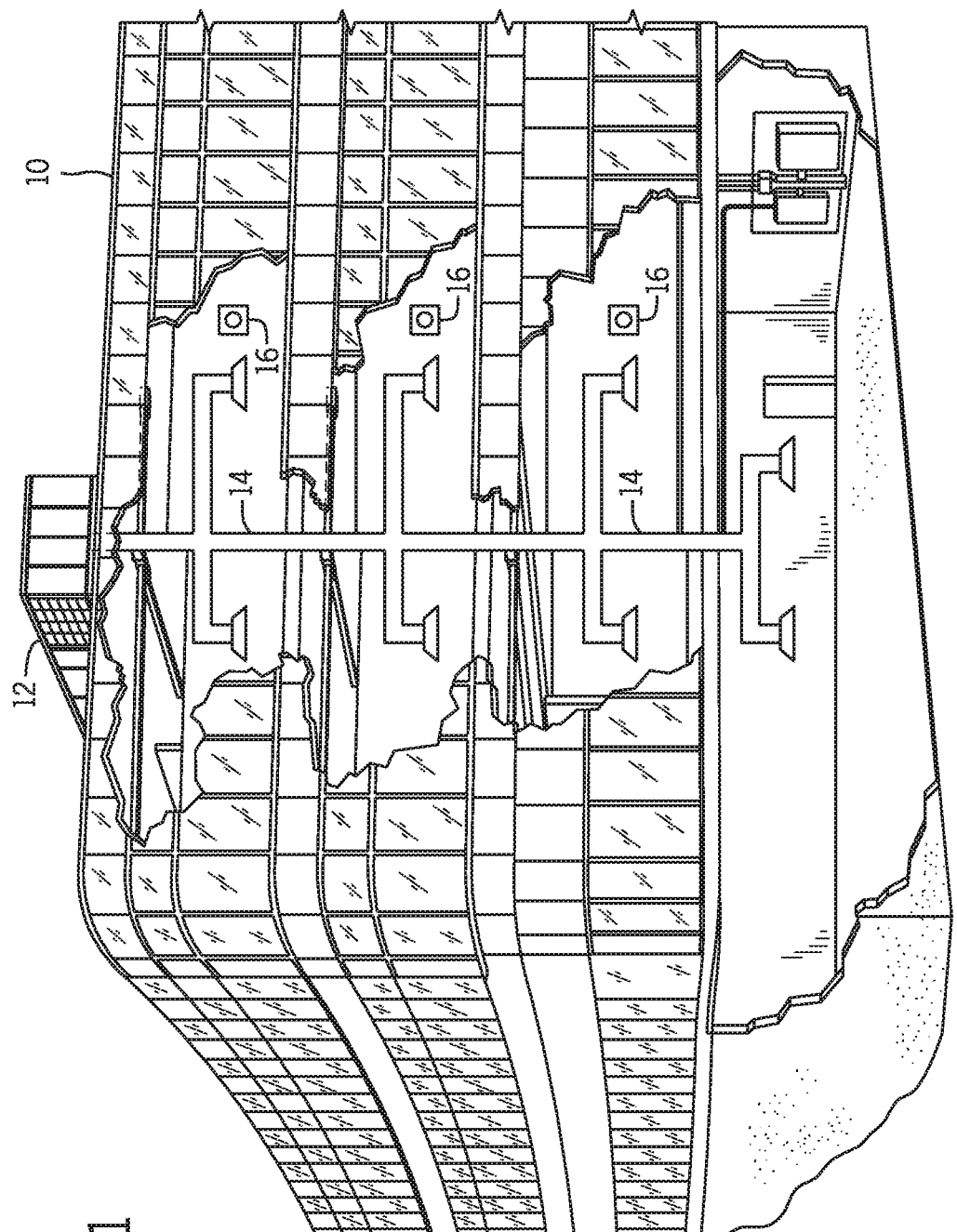
FIG. 1 illustrates a heating, ventilating, and air conditioning (HVAC) system for building environmental management that may employ one or more HVAC units, in accordance with an embodiment of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "compris-ing," "including," and "having" are intended to be inclusive and mean that there may be additional elements other than the listed elements.

Embodiments of the present disclosure generally relate to controlling mass flow of refrigerant (e.g., coolant) circulated through a cooling system. A cooling system may include one or more heat exchangers that facilitate transferring energy (e.g., heat) from one location to another. In particular, refrigerant in a heat exchanger may experience a phase change that cause energy exchange between the refrigerant and a fluid (e.g., water or air) flowing through the cooling system. For example, as refrigerant is circulated through an evaporator coil in an evaporator heat exchanger, the refrigerant changes from a liquid state to a gas state due to temperature of air surrounding the evaporator coil. In this manner, vaporization of the refrigerant may absorb heat from the surrounding air, thereby cooling the air.

In some instances, a heat exchanger may be implemented with multiple parallel heat exchanger coils. For example, an evaporator heat exchanger may be implemented using multiple parallel evaporator coils, which may increase surface area of liquid refrigerant and, thus, improve energy exchange efficiency of the evaporator heat exchanger. Nevertheless, in some instances, energy exchange efficiency of a heat exchanger may be dependent on uniformity of refrigerant mass flow distribution between the multiple parallel heat exchanger coils. For example, energy exchange efficiency of the evaporator heat exchanger may improve when refrigerant mass flow through a first evaporator coil is approximately equal to refrigerant mass flow through a second evaporator coil.

Moreover, in some instances, mass flow distribution of the refrigerant may vary based at least in part on operational parameters of the cooling system. For example, operating a compressor in the cooling system, which drives circulation of the refrigerant, at a maximum operating capacity may produce a first refrigerant mass flow that results in approximately uniform refrigerant mass flow distribution between the first evaporator coil and second evaporator coil. However, operating the compressor at a lower operating capacity may produce a second refrigerant mass flow that results in refrigerant mass flow through the first evaporator coil differing from refrigerant mass flow through the second evaporator coil, which may affect heat exchange efficiency of the evaporator heat exchanger, and thus may decrease the performance of the refrigeration system.

Accordingly, the present disclosure provides techniques to facilitate improving energy exchange efficiency of a heat exchanger implemented in a cooling system, for example, by improving refrigerant mass flow distribution uniformity through multiple parallel heat exchanger coils implemented in the heat exchanger. In other words, the present techniques may facilitate maintaining a target (e.g., uniform) mass flow distribution through the evaporator coils over an increased range of operating conditions. To facilitate improving or maintaining mass flow distribution uniformity, in some embodiments, an expansion device that supplies refrigerant to an evaporator heat exchanger may include multiple capillary expansion tubes, which each supply refrigerant to a corresponding evaporator coil, and an expansion valve (e.g. electrical expansion valve) fluidly coupled between a condenser of the cooling system and the capillary expansion tubes. In some embodiments, the expansion valve may be "oversized," such that the expansion valve is not expected to substantially affect refrigerant mass flow from the condenser to the capillary expansion tubes when opened at or above a threshold (e.g., fully open or 100% open) position. In other words, the expansion valve may be a low flow-resistant valve.

Additionally, in some embodiments, the capillary expansion tubes may be implemented (e.g., sized) such that they are "sonic limited" or "choked" when a compressor, which drives circulation of refrigerant, is operating at or above a threshold (e.g., maximum or 100%) operating capacity. In other words, when the compressor is operating at or above the threshold operating capacity, refrigerant mass flow output from the condenser may be greater than or equal to combined (e.g., total) refrigerant mass flow throughput provided by the capillary expansion tubes. As such, refrigerant mass flow through each capillary expansion tube may be proportionally restricted, thereby resulting in refrigerant mass flow output from the condenser being divided approximately uniformly between the multiple capillary expansion tubes and, thus the multiple evaporator coils.

Generally, choked flow results in the mass flow through a fluid passageway, here the capillary expansion tubes, being independent of the downstream pressure. In other words, choked flow may result in the mass flow being a function of upstream properties, such as subcooling of the refrigerant entering the passageway, flow quality of the refrigerant entering the passageway, and/or geometry of the passageway. The flow of modestly subcooled or relatively high flow quality refrigerant through a capillary expansion tube may be choked when the refrigerant pressure drop through the capillary expansion tube is a substantially high fraction of the absolute refrigerant pressure entering the capillary expansion tube. Accordingly, when oversized, the expansion valve fluidly coupled between the condenser and the capillary expansion tubes may be maintained in an open position at or above the threshold position, thereby resulting a majority of the pressure drop exerted on the refrigerant in the expansion device taking place in the capillary expansion tubes.

However, when the compressor is operating below the threshold operating capacity, refrigerant mass flow output from the compressor may reduce to a point where the capillary expansion tubes are not "sonic limited" or "choked." In other words, when the compressor is operating below the threshold operating capacity, refrigerant mass flow output from the condenser may be less than the combined (e.g., total) refrigerant mass flow throughput provided by the capillary expansion tubes. As such, refrigerant mass flow through each capillary expansion tube may be unproportionally restricted, which may increase the likelihood of refrigerant mass flow output from the condenser being divided non-uniformly between the multiple capillary expansion tubes and, thus the multiple evaporator coils.

To reduce likelihood of non-uniform refrigerant distribution, the expansion valve fluidly coupled between the condenser and the capillary expansion tubes may be adjusted to an open position less than the threshold position when the compressor is expected to be operating below the threshold operating capacity. By adjusting its expansion valve position in this manner, the expansion valve may introduce a pressure drop between the condenser and the capillary expansion tubes. In other words, the expansion valve may be controlled to introduce a pressure drop on the refrigerant in addition to the pressure drop that is subsequently exerted on the refrigerant by the capillary expansion tubes.

As described above, the choked flow rate through a capillary expansion tube may be a function of the entering refrigerant properties, such as the subcooling of liquid refrigerant and/or the flow quality. Subcooling refers to liquid existing at a temperature below its normal boiling point. Flow quality is a measure of the mass of vapor over the mass of vapor plus the mass of liquid refrigerant. For subcooled entering refrigerant, the choked flow rate may be higher when the refrigerant is more subcooled, and the choked flow rate may be lower when the refrigerant is less subcooled. For two-phase (e.g., partially in liquid phase and partially in gas phase) entering refrigerant, the choked flow rate may be higher when the flow quality is lower and the choked flow rate may lower when the flow quality is higher.

In some embodiments, the pressure drop produced by adjusting valve position (e.g., to a less open position) of the expansion valve may reduce pressure on the refrigerant output from the condenser below the refrigerant's vapor pressure, which causes a decrease in refrigerant subcooling and/or an increase in refrigerant flow quality before entering the capillary expansion tubes. Therefore, changing the properties of the refrigerant by closing or opening the expansion valve may be leveraged to facilitate achieving approximately uniform refrigerant mass flow distribution between the capillary expansion tubes, for example, by maintaining choked flow through the capillary expansion tubes even when operating capacity of the system changes. For example, decreasing the subcooling or increasing the flow quality of the refrigerant entering the capillary expansion tubes may decrease the choked flow rate of the refrigerant in the capillary tubes, thereby resulting in each capillary expansion tube being "sonic limited" or "choked" even when operating capacity of the compressor is decreased and/or the capillary expansion tubes are sized for a higher compressor operating capacity. In other words, to facilitate approximately uniformly distributing refrigerant mass flow between the multiple capillary expansion tubes and, thus, the evaporator coils, the expansion valve may be controlled to adjust expansion valve position based at least in part on operational parameters of the cooling system, such as operating capacity of the compressor, to change the characteristics or properties of the refrigerant entering the capillary expansion tubes.

Refrigerant output from the evaporator heat exchanger may be circulated back through the compressor. In some instances, circulating liquid refrigerant into the compressor may affect operation of the compressor since liquid is generally less compressible. In fact, attempting to compress liquid refrigerant may reduce lifespan and/or operational reliability of the compressor. As described above, adjusting the expansion valve position to less than the threshold position may result in some or more of the refrigerant beginning to vaporize before entering the evaporator coils. Accordingly, in some embodiments, the expansion valve may be controlled (e.g., to adjust valve position) to reduce likelihood of liquid refrigerant being output from the evaporator coils, which, in turn, may improve lifespan and/or operational reliability of the compressor.

Additionally or alternatively, to facilitate reducing likelihood of liquid refrigerant being circulated into the compressor, an accumulator (e.g., a suction line accumulator) may be fluidly coupled between the evaporator coil and the compressor. In some embodiments, the accumulator may collect (e.g., block) liquid refrigerant while passing vapor refrigerant to the compressor. Moreover, in some embodiments, liquid refrigerant collected in the accumulator may backpressure refrigerant in the evaporator heat exchanger. In fact, the backpressure from the accumulator may result in reducing flow rate of refrigerant through the evaporator coils, thereby enabling refrigerant to absorb more heat before being out from the evaporator coils and, thus, reducing likelihood of liquid refrigerant being output from the evaporator coils. In this manner, the techniques described in the present disclosure facilitate improving operation of a cooling system.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
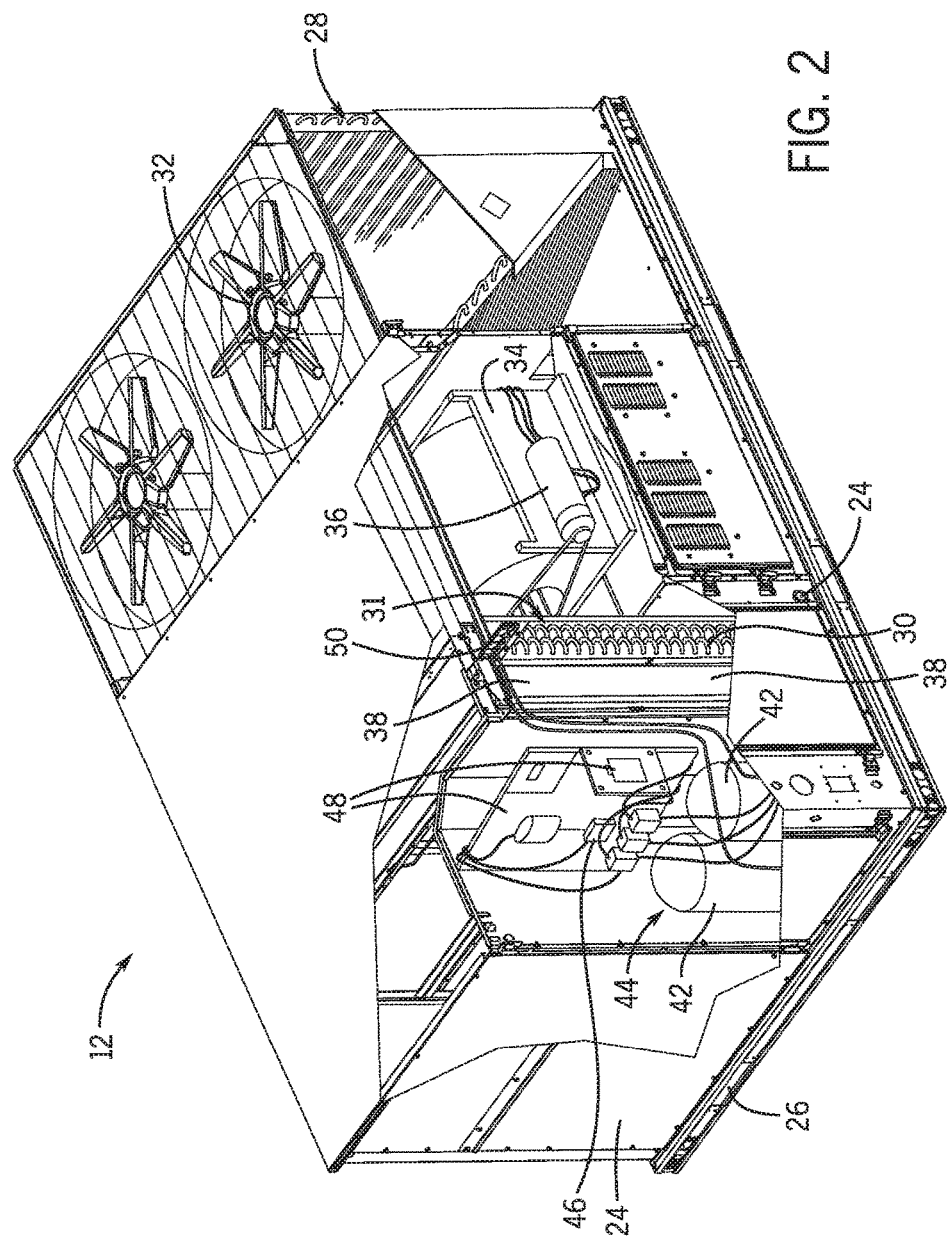
FIG. 2 is a perspective view of an HVAC unit of the HVAC system of FIG. 1, in accordance with an embodiment of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 50 may connect the control board 48 and the terminal block 46 to the equipment of the HVAC unit 12.

Figure 3:
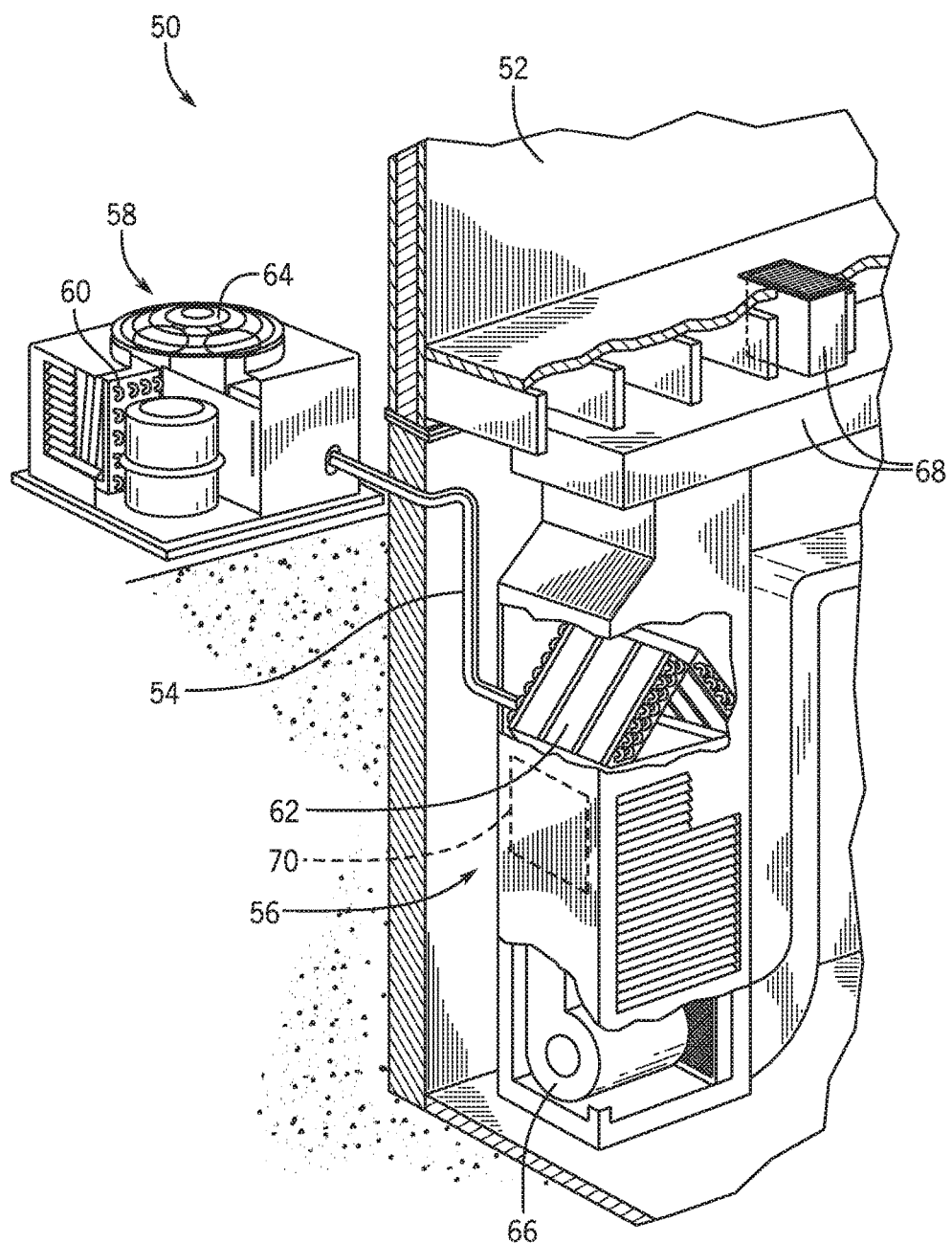
FIG. 3 illustrates a residential heating and cooling system, in accordance with an embodiment of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
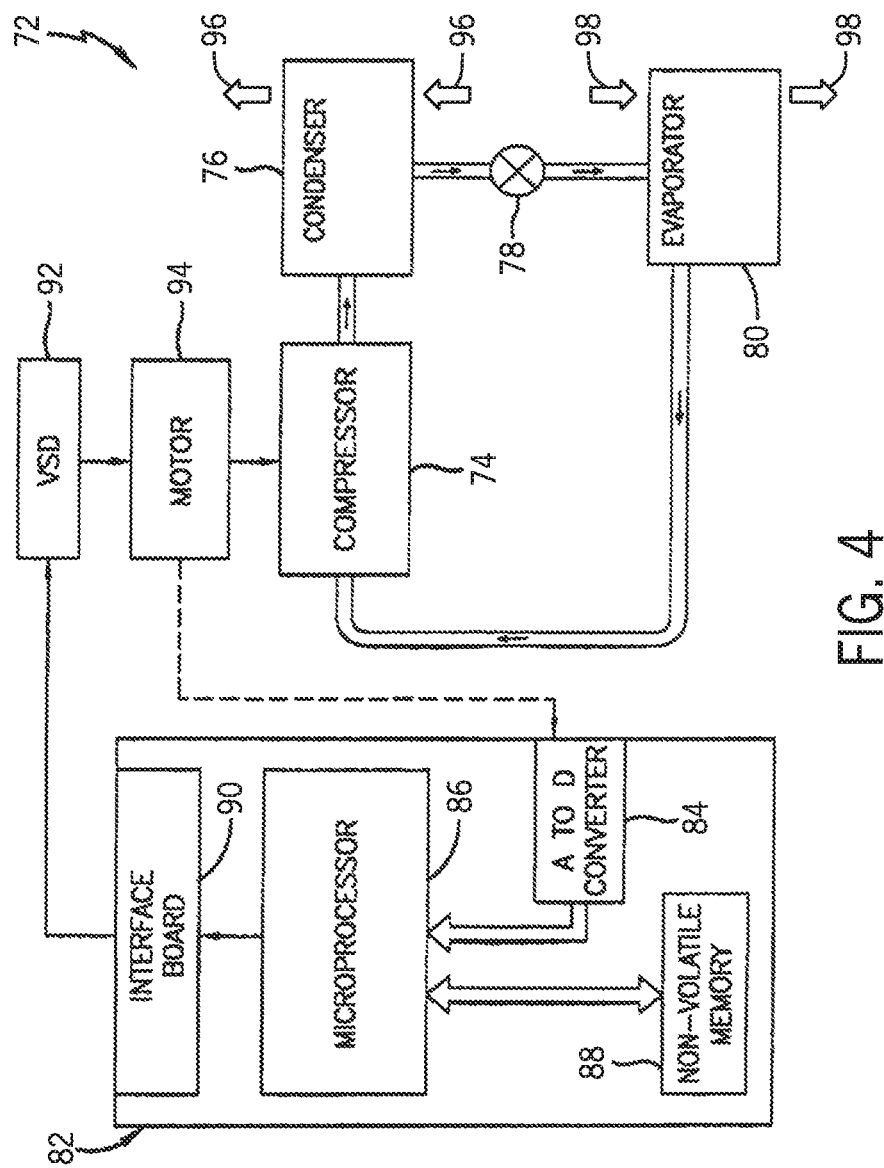
FIG. 4 illustrates a vapor compression system that may be used in the HVAC system of FIG. 1 and in the residential heating and cooling system of FIG. 3, in accordance with an embodiment of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC system. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The description above in FIGS. 1-4 is intended to illustrative of the context of the present disclosure. The techniques of the present disclosure may update features of the description above. As will be discussed in detail below, operation of a cooling system may be improved by an increase in the uniformity of the distribution of the mass flow of refrigerant through coils of the evaporator 80 (e.g., evaporator heat exchanger). For example, the expansion device 78 may include an adjustable oversized expansion valve, as well as multiple capillary expansion tubes to facilitate approximately uniformly distributing refrigerant mass flow output from the condenser between the multiple capillary expansion tubes and, thus, the multiple evaporator coils.

Figure 5:
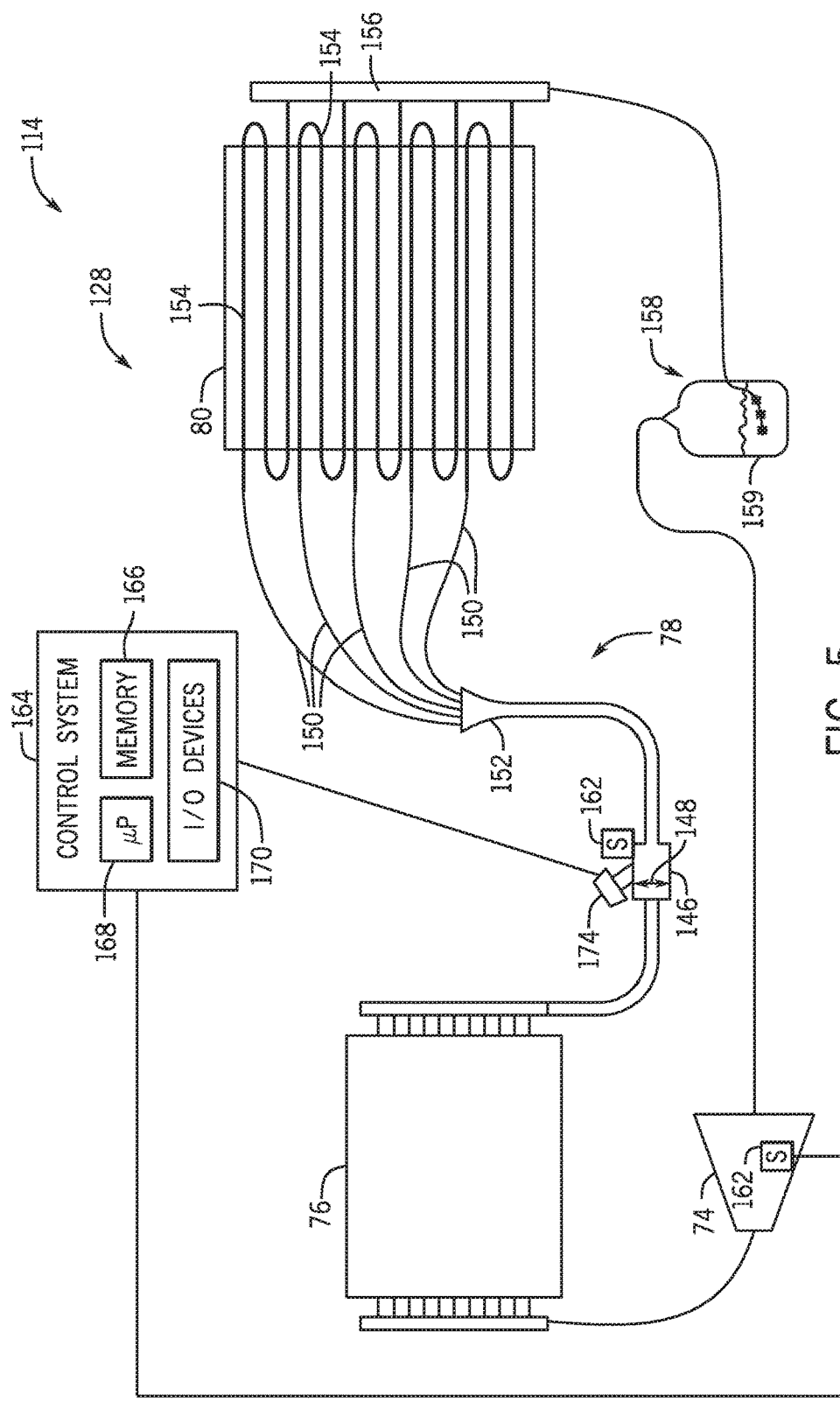
FIG. 5 is a schematic diagram of a refrigerant loop of a cooling system, in accordance with an embodiment of the present disclosure.

To illustrate, a detailed view of a refrigerant loop 128 of a cooling system 114 is shown in FIG. 5. The cooling system 114 may include the refrigerant loop 128 that circulates the refrigerant through the evaporator heat exchanger 80, the condenser heat exchanger 76 (e.g., condenser 76), the expansion device 78, and the compressor 74, which drives (e.g., pumps) circulation of the refrigerant in the refrigerant loop 128. In any case, during operation, the evaporator heat exchanger 80 may receive refrigerant output from the expansion device 78. In some embodiments, the evaporator heat exchanger 80 may include one or more evaporator paths through which the refrigerant flows. For example, the evaporator heat exchanger 80 may include multiple parallel evaporator paths 154 (e.g. parallel evaporator channels, parallel evaporator circuits).

In some embodiments, the compressor 74 may be driven by a compressor motor to compress the refrigerant and/or drive circulation of the refrigerant through the refrigerant loop 128. In particular, the compressor 74 may reduce volume available for the vapor refrigerant, thereby increasing pressure and temperature of the vapor refrigerant. The compressor 74 may be any suitable compressor, such as a screw compressor, reciprocating compressor, rotary compressor, swing link compressor, scroll compressor, turbine compressor, and/or the like.

Additionally, in some embodiments, the compressor 74 may be driven by a motor that receives electrical power from a power source, such as a variable speed drive (VSD). In other words, in some embodiments, the compressor motor may receive variable voltage and/or variable frequency electrical power from a variable speed drive and, thus, drive the compressor 74 at varying operating capacities. Since the compressor 74 drives circulation of the refrigerant, adjusting operating capacity of the compressor 74 may affect refrigerant mass flow through the refrigerant loop 128. For example, operating the compressor 74 at a higher (e.g., maximum) operating capacity may result in a higher refrigerant mass flow through the rest of the refrigerant loop 128 compared to operating the compressor 74 at a lower operating capacity.

Furthermore, the expansion device 78 may receive liquid refrigerant output from the condenser heat exchanger 76 and exert a pressure drop by retricting flow of the liquid refrigerant. In some instances, the pressure drop may cause some of the refrigerant to vaporize. In fact, the vaporization may absorb heat from surrounding liquid refrigerant, thereby further lowering temperature of the liquid refrigerant. Thus, in some instances, the refrigerant supplied from the expansion device 78 to the evaporator heat exchanger 80 may include liquid refrigerant as well as vapor refrigerant.

In some embodiments, the expansion device 78 may include a low flow-resistant expansion valve (e.g., electric expansion valve, thermal expansion valve, ball valve) and/or a set of capillary expansion tubes, which supply refrigerant to the evaporator heat exchanger 80. As described above, in some embodiments, the evaporator heat exchanger may include multiple parallel evaporator coils. In such embodiments, the expansion device 78 may include multiple capillary expansion tubes that each supply refrigerant to a corresponding one of the parallel evaporator coils.

As depicted, the evaporator heat exchanger 80 includes multiple parallel evaporator paths 154. Additionally, in the depicted embodiment, the expansion device 78 includes an oversized expansion valve 146 (e.g., low flow-resistant valve) and multiple capillary expansion tubes 150. In particular, each capillary expansion tube 150 may be fluidly coupled to a corresponding evaporator path 154 to facilitate supplying refrigerant to the corresponding evaporator path 154. In some embodiments, each of the capillary expansion tubes 150 may have approximately the same characteristics (e.g., cross-sectional area and/or length) or geometry to facilitate uniformly distributing refrigerant mass flow between the capillary expansion tubes 150 and, thus, the evaporator paths 154.

As described above, uniformly distributing refrigerant mass flow between the evaporator paths 154 generally facilitates improving energy (e.g., heat) exchange efficiency of the evaporator heat exchanger 80. Nevertheless, in some embodiments, improved energy exchange efficiency and/or other operating objectives may be achieved by non-uniformly distributing refrigerant mass flow between the evaporator paths 154, for example, by implementing the capillary expansion tubes 150 with varying characteristics. In other words, the characteristics of the capillary expansion tubes 150 may facilitate achieving any target (e.g., desired) refrigerant mass flow distribution.

In any case, operation of the cooling system 114 may be controlled to facilitate achieving the target refrigerant mass flow distribution. To facilitate controlling operation, the cooling system 114 may include a control system 164 (e.g., controller). In some embodiments, the control system 164 includes memory 166, a processor 168, and input/output (I/O) devices 162. The I/O devices 170 may facilitate communication between the control system 164 and a user (e.g., operator). For example, the I/O devices 170 may include a button, a keyboard, a mouse, a trackpad, and/or the like to enable user interaction with the control system 164. Additionally, the I/O devices 170 may include an electronic display to facilitate providing a visual representation of information, for example, via a graphical user interface (GUI), an application interface, text, a still image, and/or video content.

In some embodiments, the memory 166 may include one or more tangible, non-transitory, computer-readable media that store instructions executable by the processor 168 and/or data to be processed by the processor 168. For example, the memory 166 may include random access memory (RAM), read only memory (ROM), rewritable non-volatile memory such as flash memory, hard drives, optical discs, and/or the like. Additionally, the processor 168 may include one or more general purpose microprocessors, one or more application specific processors (ASICs), one or more field programmable logic arrays (FPGAs), or any combination thereof.

Furthermore, in some embodiments, the control system 164 may control operation of the cooling system 114 based at least in part on operational parameters of the cooling system 114. In particular, the control system 164 may determine some operational parameters based at least in part on sensor data received from one or more sensors 162. For example, the control system 164 may determine valve position of the oversized expansion valve 146 based at least in part on sensor data received from a sensor 162 coupled to the oversized expansion valve 146. Additionally, the control system 164 may determine operating capacity of the compressor 74 based at least in part on sensor data received from a sensor coupled to the compressor 74. For example, the sensor data may indicate speed of a motor driving the compressor 74.

The sensors 162 may be disposed at one or more locations about the cooling system 114, for example, at the oversized expansion valve 146 and/or at the compressor 74. In some embodiments, the sensors 162 may measure the mass flow rate and/or the pressure of the refrigerant. For example, in the illustrated embodiment, a sensor 162 disposed about the compressor 74 may measure the flow rate of the refrigerant from the compressor 74. Additionally or alternatively, one or more sensors 162 may be disposed on or near the oversized expansion valve 146, for example, at the upstream side of the oversized expansion valve 146 and/or at the downstream side of the oversized expansion valve 146. These one or more sensors 162 may measure the flow rate, the temperature, and/or the pressure, and thus the pressure differential, of the refrigerant at or across the oversized expansion valve 146.

Additionally or alternatively, the sensors 162 may include one or more temperature sensors that determine temperature of the refrigerant, temperature of fluid flowing through the cooling system 114, and/or temperature of components (e.g., the evaporator heat exchanger 80) in the cooling system 114. The sensors 162 may also include one or more pressure sensors that determine pressure of the refrigerant, pressure of fluid flowing through the cooling system 114, internal pressure of components (e.g., the evaporator heat exchanger 80) in the cooling system 114, and/or external pressure of components in the cooling system 114. The one or more sensors 162 may communicate sensor data (e.g., as sensor signals) indicative of the determined operational parameters (e.g., flow rate and/or pressure) to the control system 164.

To control operation of the cooling system 114, the control system 164 may be communicatively coupled to one or more components (e.g., equipment or machines) in the cooling system 114. For example, the control system 164 may be communicatively coupled to the oversized expansion valve 146 (e.g., low flow-resistant valve). In this manner, the control system 164 may instruct an actuator 174 to adjust valve position of the oversized expansion valve 146 via one or more control signals. Additionally, the control system 164 may be communicatively coupled to the compressor 74. In this manner, the control system 164 may instruct the compressor 74 to adjust operating capacity via one or more control signals.

As previously discussed, the refrigerant enters the condenser heat exchanger 76 as a high pressure and high temperature vapor and flows through one or more condenser coils. In a condenser coil, heat from the vapor refrigerant may be extracted by fluid (e.g., water or air) surrounding the condenser coil. Heat transfers from the vapor refrigerant may increase temperature of the surrounding fluid and cause the refrigerant to condense.

As described above, the expansion device 78 may include an oversized expansion valve 146 (e.g., oversized electric expansion valve, low flow-resistant valve) and multiple capillary expansion tubes 150. In the depicted embodiment, the oversized expansion valve 146 is fluidly coupled to an output of the condenser heat exchanger 76. As such, the oversized expansion valve 146 may control properties and/or flow of the refrigerant through the expansion device 78 and, thus, the evaporator heat exchanger 80.

In some embodiments, the refrigerant loop 128 of the cooling system 114 may include two or more evaporator heat exchangers 80. In such embodiments, the refrigerant output from the condenser heat exchanger 76 may be divided between two or more paths, each having an oversized expansion valve 146. Each oversized expansion valve 146 maybe fluidly coupled to a distributor 152 and to multiple parallel capillary tubes 150, each feeding refrigerant into a corresponding evaporator path 154 of one or the two or more evaporator heat exchangers 80. The outputs of each evaporator heat exchanger 80 may then merge before the accumulator 158. As such, the control system 164 may be used to control a valve position of each oversized expansion valve 146 and, thus, properties and/or flow of the refrigerant through each evaporator heat exchanger 80.

In some embodiments, an expansion valve may be considered "oversized" or low flow-resistant when the expansion valve is not expected to substantially affect refrigerant mass flow from the condenser heat exchanger 76 to the capillary expansion tubes 150 while opened at or above a threshold (e.g., fully open or 100% open) position. For example, open cross-sectional area 148 of the oversized expansion valve 146 may be approximately equal (e.g., slightly smaller) to open cross-sectional area 148 of an upstream conduit fluidly coupled between the condenser heat exchanger 76 and the oversized expansion valve 146. In other words, when its valve position is at the threshold position, the oversized expansion valve 146 may have an open cross-sectional area 148 larger than cross-sectional area of a typical expansion valve utilized in a cooling system. The low flow-resistant controllable expansion valve 146 may impart a controllable pressure drop on the refrigerant flowing through it. The range of this controllable pressure drop may vary from very small (e.g., negligible)

when the valve is at the threshold position to a modest fraction of the pressure difference between the suction to and discharge from the compressor 74.

When its valve position is at the threshold position, the oversized expansion valve 146 may slightly restrict refrigerant flow, thereby producing a slight pressure drop across the oversized expansion valve 146 due to the Venturi effect. For example, pressure drop across the oversized expansion valve 146 may be less than one psi. In other words, the refrigerant may be at approximately the same (e.g., slightly lower downstream) on the upstream side and the downstream side of the oversized expansion valve 146. Thus, when valve position of the oversized expansion valve 146 is at the threshold position, the majority of the pressure drop exerted on the refrigerant by the expansion device 78 may take place in the capillary expansion tubes 150. Nevertheless, the oversized expansion valve 146 may be the dividing point between the high pressure side and the low pressure side of the refrigerant loop 128 since adjusting valve position of the oversized expansion valve 146 below the threshold position may result in a larger pressure drop across the oversized expansion valve 146.

As will be described in more detail below, the relatively smaller pressure drop across the oversized expansion valve 146 may enable greater control of the characteristics or properties of the refrigerant entering the capillary expansion tubes 150 and the pressure drop of the refrigerant across the capillary expansion tubes 150. In some embodiments, flow through the oversized expansion valve 146 may be approximately isenthalpic and, thus, generally proceeds without any change in enthalpy. Consequently, when refrigerant flowing through the oversized expansion valve 146 is subcooled, the subcooling of the refrigerant leaving the oversized expansion valve 146 may be lower than the subcooling of the refrigerant entering the oversized expansion valve 146. When refrigerant flowing through the oversized expansion valve 146 is in two phase flow, the flow quality of the refrigerant leaving the oversized expansion valve 146 may be higher than the flow quality of the refrigerant entering the oversized expansion valve 146.

In addition, as the oversized expansion valve 146 is controlled to impart a greater pressure drop on the refrigerant flowing through it, the magnitude of the decrease in subcooling or the rise in flow quality is increased. For example, due to the pressure drop, if the liquid refrigerant entering the oversized expansion valve is subcooled, the subcooling of the may decrease. Furthermore, in some embodiments, the pressure drop across the oversized expansion valve 146 may result in the refrigerant flashing into two phases (e.g., liquid and vapor), for example, with vapor bubbles forming in the liquid refrigerant. Additionally or alternatively, when the refrigerant flowing through the oversized expansion valve 146 is already in two phase flow, the pressure drop across the oversized expansion valve 146 may increase the flow quality of the refrigerant, for example, due to an increase in the vapor mass flow.

The refrigerant loop 128 may include a distributor 152 fluidly coupled between the oversized expansion valve 146 and the capillary expansion tubes 150. As previously mentioned, in some instances, the liquid refrigerant may be in two phases (e.g., liquid and vapor) after flowing through the oversized expansion valve 146. The distributor 152 may facilitate distributing two-phase refrigerant approximately uniformly between each of the capillary expansion tubes 150. Equal distribution of the refrigerant, based on pressure and properties (e.g., state) of the refrigerant, may facilitate improving uniformity of refrigerant mass flow through the capillary expansion tubes 150 and, thus, through the evaporator paths 154.

The refrigerant loop 128 may include multiple capillary expansion tubes 150 (e.g., parallel capillary expansion tubes). In the illustrated embodiment, the distributor 152 is coupled to five capillary expansion tubes 150 (e.g., parallel capillary expansion tubes). However, in other embodiments, there may be any quantity of capillary expansion tubes 150 (e.g., 2, 3, 4, 5, 6, 7, 8, or more). The capillary expansion tubes 150 may be lengths of tubing with a small open cross-sectional area, which may exert a pressure drop on the refrigerant that results in expansion and/or a change in a property (e.g., state) of the refrigerant. Each capillary expansion tube 150 may have an open cross-sectional area smaller than the open cross-sectional area of the distributor 152 and/or a conduit fluidly coupled between the oversized expansion valve 146 and the capillary expansion tubes 150.

In fact, in some embodiments, the open cross-sectional area of the capillary expansion tubes 150 may be smaller than the open cross-sectional area of a typical distributor tube used to supply refrigerant to an evaporator path 154. Thus, the pressure of the refrigerant may drop across the capillary expansion tubes 150 creating a pressure differential between the refrigerant upstream of the capillary expansion tubes 150 and the refrigerant downstream of the capillary expansion tubes 150. For example, the capillary expansion tubes 150 may exert a pressure drop on the refrigerant of approximately 200 psi. In other words, the pressure drop that occurs across each capillary expansion tube 150 may be larger than a pressure drop that occurs across a typical distributor tube.

As described above, the pressure drop across the capillary expansion tubes 150 may be larger than the pressure drop across the oversized expansion valve 146. In some embodiments, flow of modestly subcooled or relatively high flow quality refrigerant through the capillary expansion tubes 150 may be choked when the refrigerant pressure drop through the capillary expansion tubes 150 is a sufficiently high fraction of the absolute refrigerant pressure entering the capillary expansion tubes. As such, the capillary expansion tubes 150 may be the primary expansion device 78 of the cooling system 114. In fact, a relatively larger pressure drop and choked flow of refrigerant across the capillary expansion tubes 150 may facilitate achieving refrigerant mass flow uniformity through the evaporator heat exchanger 80. Therefore, in general, as the pressure differential across the capillary expansion tubes 150 increases (e.g., as the pressure drop increases), the flow rate of the refrigerant may increase to a point where the flow rate through the capillary expansion tubes 150 can no longer increase, as the reservoir or refrigerant upstream of the capillary expansion tubes 150 decreases. In this manner, the flow through the capillary expansion tubes 150 is said to be choked, or sonic limited, such that the refrigerant mass flow through each capillary expansion tube 150 is equally restricted. The nature of the choked flow through the capillary expansion tubes 150 may facilitate uniformity in the mass flow of the refrigerant through the capillary expansion tubes 150, and consequently through parallel evaporator paths 154 of the evaporator heat exchanger 80, as well as help enable a reduction in migration of the refrigerant mass within the refrigeration loops 128.

As the refrigerant flows through the capillary expansion tubes 150, a portion of, or a larger portion of, the liquid refrigerant may convert into vapor as the pressure of the refrigerant drops across the capillary expansion tubes 150. Each capillary expansion tube 150 may direct the refrigerant into a corresponding evaporator path 154 of the evaporator heat exchanger 80. In other words, the capillary expansion tubes 150 may act as feeder tubes to the individual circuits (e.g. evaporator paths 154) of the evaporator heat exchanger 80. There may be any quantity of evaporator paths 154 within the evaporator (e.g., 1, 2, 3, 4, 5, 6, or more) and the quantity of capillary expansion tubes 150 may be equal to the quantity of evaporator paths 154.

The greater the quantity of evaporator paths 154 and/or the greater the quantity of turns of each evaporator path 154 within the evaporator heat exchanger 80, the greater the surface area of the refrigerant within the evaporator heat exchanger 80 for heat exchange. Similarly, each evaporator path 154 may wind through the evaporator heat exchanger 80 one or more times, thus, further increasing the surface area of the refrigerant for heat exchange. When the liquid refrigerant reaches the evaporator heat exchanger 80, the pressure of the refrigerant has been reduced. The reduction in pressure of the refrigerant through the capillary expansion tubes 150 may dissipate the heat within the liquid refrigerant, thus cooling the refrigerant. Therefore, the refrigerant may absorb heat from the surrounding fluid (e.g., air or water) as the refrigerant flows through the evaporator paths 154 within the evaporator heat exchanger 80, thus causing the liquid refrigerant to vaporize. The absorption of heat by the refrigerant and the cooling of the surrounding fluid that occurs in the evaporator heat exchanger 80 may be described as the heat transfer output of the evaporator heat exchanger 80 and of the cooling system 114. Uniformity of refrigerant mass flow through the evaporator paths 154 may enable an increase in the heat transfer performance of the evaporator heat exchanger 80, and thus an increase in the performance of the cooling system 114.

The low pressure vapor refrigerant from the evaporator paths 154 may collect in a manifold 156 on the downstream side of the evaporator heat exchanger 80. From the evaporator heat exchanger 80, the high temperature, low-pressure vapor refrigerant may flow through the refrigerant loop 128 toward the compressor 74.

In some embodiments, the cooling system 114 may include an accumulator 158 (e.g., suction line accumulator) fluidly coupled between the evaporator heat exchanger 80 and the compressor 74 (e.g., along the suction line leading to the compressor 74). The accumulator 158 includes a reservoir 159 and may act as a liquid catcher for any liquid refrigerant that may exit the evaporator. The accumulator 158 may reduce likelihood of the compressor 74 receiving liquid refrigerant (e.g., slugs of liquid refrigerant) that may be output from the evaporator heat exchanger 80. For example, to reduce likelihood of liquid refrigerant being supplied to the compressor 74, the reservoir 159 of the accumulator 158 may collect any liquid refrigerant remaining after flowing through the evaporator heat exchanger 80. In this manner, the accumulator 158 may facilitate improving lifespan and/or operational reliability of the compressor 74, which may otherwise be affected by attempting to compress liquid refrigerant in the compressor.

In any case, low pressure vapor refrigerant may be supplied to the compressor 74. As previously discussed, the compressor 74 may be any type of compressor, a variable speed compressor, or tandem compressors. Within the compressor 74, a reduced volume available for the vapor refrigerant compresses the low pressure vapor refrigerant into a high pressure vapor refrigerant. The refrigerant exits the compressor as a high temperature and high pressure vapor along refrigeration loop 128, enters the condenser heat exchanger 76, and is ready to begin the refrigerant loop 128 again.

As described above, the control system 164 may control operation of the cooling system 114 to facilitate achieving uniform refrigerant mass flow rate and distribution of the refrigerant through the evaporator paths 154 and/or to reduce migration and redistribution of the refrigerant mass throughout the refrigerant loop 128. For example, the control system 164 may control operation of the cooling system 114 by communicating control signals, which instruct the actuator 174 to adjust valve position of the oversized expansion valve 146. In particular, the actuator 174 may receive the control signals sent by the control system 164 and actuate (e.g., move) to open or close the oversized expansion valve 146 accordingly.

The opening and/or closing of the oversized expansion valve 146 may control the pressure drop and/or refrigerant properties downstream of the oversized expansion valve 146. In this manner, adjusting valve position of the oversized expansion valve 146 may control pressure drop and choked flow rate of the refrigerant through the capillary expansion tubes 150 and the evaporator paths 154. By controlling the mass flow rate of the refrigerant through the capillary expansion tubes 150, the control system 164 may control the uniformity of the refrigerant flow through the evaporator paths 154 and the distribution of the refrigerant through the cooling system 114.

As described above, when the oversized expansion valve 146 is opened at or above the threshold position (e.g., fully open or 100% open), there may be a relatively small pressure drop, if any, exerted on the refrigerant by the oversized expansion valve 146. This relatively small pressure drop may enable the majority of the pressure drop of to occur across the capillary expansion tubes 150, as previously discussed. In particular, the capillary expansion tubes 150 may be implemented (e.g., sized) such that they are "choked" when the compressor 74 is operating at full capacity. A decrease in the mass flow rate of the refrigerant in the cooling system 114 may occur, for example due to the slowdown in a variable speed compressor or the shut off of a compressor if there are tandem compressors such that the compressor 74 is operating below a threshold (e.g., maximum or 100%) capacity.

Upon a decrease in the mass flow of the refrigerant, control system 164 may receive input signals from the sensors 162 indicative of the measured flow rate at the compressor 74 and/or the oversized expansion valve 146. When the compressor 74 is operating below the threshold operating capacity, refrigerant mass flow output from the compressor 74 may reduce and, thus, the refrigerant mass flow rate entering the condenser heat exchanger 76 may be less than the combined (e.g., total) refrigerant mass flow throughput provided by the capillary expansion tubes 150 when choked. As such, the mass of the refrigerant resident within the condenser heat exchanger 76 may decrease and the system may find a new steady state at a lower mass flow rate and/or a different refrigerant distribution. Further, the mass flow rate may decrease to a point where the capillary expansion tubes 150 are no longer choked and the refrigerant mass flow through each capillary expansion tube 150 may be unproportionally restricted. This may increase likelihood of refrigerant mass flow output from the condenser heat exchanger 76 being divided non-uniformly between the multiple capillary expansion tubes 150 and, thus the multiple evaporator paths 154, and may reduce the heat transfer performance of the evaporator heat exchanger 80.

To reduce likelihood of non-uniform refrigerant distribution when the compressor 74 is operating below the threshold operating capacity, the oversized expansion valve 146 may be adjusted by the control system 164 to an open position less than the threshold position (e.g., an open position less than fully open). In this manner, the oversized expansion valve 146 may introduce or increase the pressure drop exerted on the refrigerant before the refrigerant is supplied to the capillary expansion tubes 150. In some embodiments, if the liquid refrigerant from the condenser heat exchanger 76 is subcooled, an increase in the pressure drop across the oversized expansion valve 146 may decrease the subcooling of the liquid refrigerant output from the oversized expansion valve 146 and, thus, the refrigerant entering the capillary expansion tubes 150. In some embodiments, a decrease in the subcooling of the liquid refrigerant may cause the refrigerant to flash into two-phase flow (e.g., partially in liquid phase and partially in gas phase) before entering the capillary expansion tubes 150. In embodiments where the refrigerant from the condenser heat exchanger 76 is in two phase flow, an increase in the pressure drop across the oversized expansion valve 146 may increase the flow quality by causing more of the liquid refrigerant to vaporize.

A decrease in the subcooling of the refrigerant and/or an increase in the flow quality of the refrigerant entering the capillary expansion tubes 150 may decrease the choked flow rate of the refrigerant across through the capillary expansion tubes 150. For example, the vapor bubbles may restrict mass flow into the capillary expansion tubes 150, thereby resulting in each capillary expansion tube 150 being "choked" even when sized for higher compressor operating capacity. In this manner, the oversized expansion valve 146 may be controlled to facilitate decreasing the choked flow rate of the refrigerant in the capillary expansion tubes 150. Thus, the oversized expansion valve may facilitate maintaining choked flow when compressor 74 operation changes and approximately uniformly distributing refrigerant mass flow output from condenser heat exchanger 76 between the multiple capillary expansion tubes 150 and, thus, the multiple evaporator paths 154, and to facilitate maintenance of the distribution of the refrigerant mass throughout the refrigerant loop 128.

Thus, when the control system 164 receives the input signal or signals from the one or more sensors 162 indicative of a decrease in the mass flow from the compressor 74, the control system 164 may output a control signal or signals to the actuator 174 of the oversized expansion valve 146 instructing the actuator 174 to partially close the oversized expansion valve 146 to an open position less than the threshold position (e.g., an open position less than fully open). A partial closure of the oversized expansion valve 146 may increase the pressure drop across the oversized expansion valve 146, and thus may decrease the subcooling of the refrigerant and/or increase the flow quality of the refrigerant before the refrigerant enters the capillary expansion tubes 150. In this manner, the oversized expansion valve 146 is used to change the properties of the refrigerant entering the capillary expansion tubes 150 to maintain choked flow and control they choked flow rate across the capillary expansion tubes 150.

When the oversized expansion valve 146 is at the threshold position (e.g., approximately fully open), the choked flow rate through the capillary expansion tubes may achieve its maximum value. As described in detail above, incrementally closing the oversized expansion valve 146 to positions less than the threshold position either decreases the subcooling or increases the flow quality of the refrigerant entering the capillary expansion tubes, both of which may decrease the choked flow rate through the capillary expansion tubes 150. Conversely, if the control system 146 receives a signal or signals indicative of an increase in the mass flow from the compressor 74 and the oversized expansion valve 146 is partially closed, or not fully open to the threshold position, the control system 164 may output a control signal or signals instructing the actuator 174 to open the oversized expansion valve 146 to a more open position, or to the threshold position. Opening the oversized expansion valve 146 to a more open position may decrease the pressure drop across the oversized expansion valve 146, thereby increasing subcooling and/or decreasing flow quality of refrigerant entering the capillary expansion tubes 150. This may in turn increase the choked flow rate of the refrigerant through the capillary expansion tubes 150 to maintain uniform distribution of the refrigerant through the evaporator paths 154 and decrease the likelihood of increasing the refrigerant resident within the condenser heat exchanger 76.

Additionally, in some embodiments, increasing the pressure drop between the outlet of the condenser heat exchanger 76 and the entrance to the capillary expansion tubes 150 by closing the oversized expansion valve 146 to a position less than fully open may help maintain a liquid seal and provide moderate sub-cooling in the portion of the refrigerant loop 128 between the condenser heat exchanger 76 and the oversized expansion valve 146. The liquid seal refers to the refrigerant between the condenser heat exchanger 76 and the oversized expansion valve 146 containing only liquid refrigerant. The liquid seal and the increase in the pressure drop across the capillary expansion tubes 150 created by partially closing the oversized expansion valve 146 may reduce (e.g., minimize) undesirable migration of refrigerant mass from within high pressure components (e.g., the condenser heat exchanger 76 and piping between the condenser heat exchanger 76 and the oversized expansion valve 146) to within low pressure components (e.g., the evaporator heat exchanger 80 and piping between the evaporator heat exchanger 80 and the compressor 74).

Additionally, migration of the refrigerant mass and non-uniform distribution of the refrigerant mass flow through the evaporator paths 154 may increase likelihood of liquid refrigerant being output from the evaporator heat exchanger 80 and, thus, circulated to the compressor 74. As described above, adjusting the oversized expansion valve 146 position to less than the threshold position (e.g., to an open position less than fully open) may result in the refrigerant, or a greater portion of the refrigerant, beginning to vaporize before entering the evaporator paths 154. Accordingly, the position of the oversized expansion valve 146 may be controlled to reduce likelihood of liquid refrigerant being output from the evaporator paths 154, which, in turn, may improve lifespan and/or operational reliability of the compressor 74.

Additionally or alternatively, to facilitate reducing likelihood of liquid refrigerant being circulated into the compressor 74, the accumulator 158 (e.g., a suction line accumulator) may collect liquid refrigerant while passing vapor refrigerant to the compressor 74. Moreover, in some embodiments, liquid refrigerant collected in the accumulator 158 may backpressure the refrigerant in the evaporator heat exchanger 80. The backpressure may result in reducing the flow rate of refrigerant through the evaporator paths 154, which may enable the refrigerant to absorb more heat before being out from the evaporator paths 154 and, thus, reducing likelihood of liquid refrigerant being output from the evaporator paths 154. In this manner, operation may be controlled to facilitate improving operation of a cooling system 114.

Figure 6:
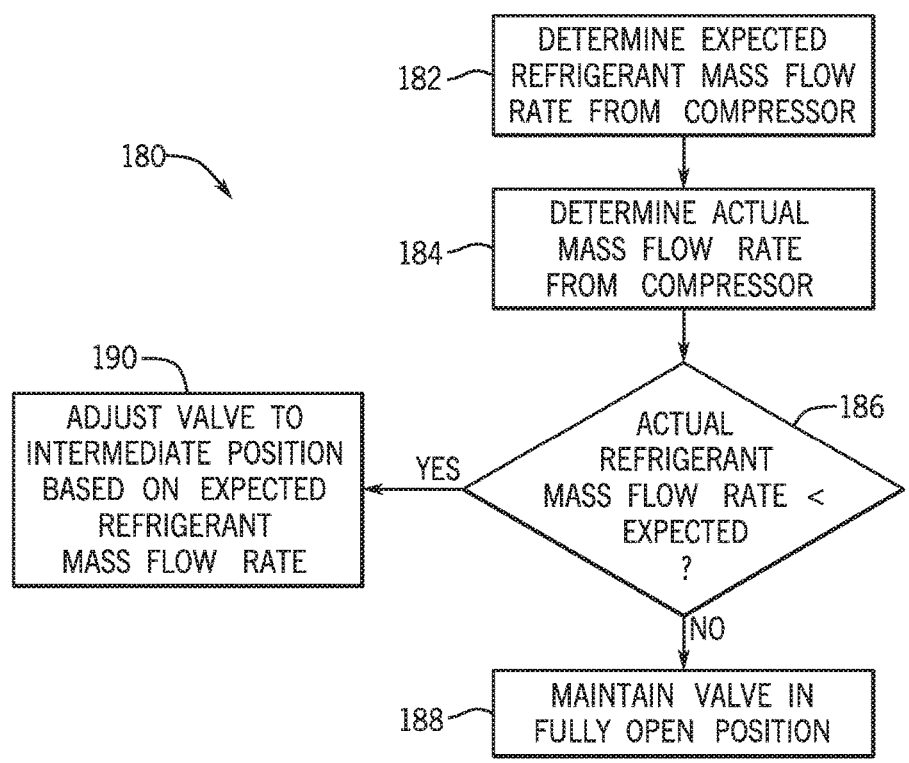
FIG. 6 is a flow diagram of a process for operating the refrigerant loop of FIG. 5, in accordance with an embodiment of the present disclosure.

To help illustrate, a process 180 for controlling operation of a cooling system 114 is described in FIG. 6. Generally, the process 180 includes determining expected refrigerant mass flow rate from a compressor (process block 182), determining actual refrigerant mass flow rate from compressor (process block 184), determining whether the actual refrigerant mass flow rate is less than the expected refrigerant mass flow rate (decision block 186), maintaining a valve position at or above a threshold when the actual refrigerant mass flow rate is not less than the expected refrigerant mass flow rate (process block 188), and adjusting the valve position to an intermediate position based at least in part on the actual refrigerant mass flow rate when the actual refrigerant mass flow rate is less than the expected refrigerant mass flow rate (process block 190). In some embodiments, the process 180 may be implemented by executing instructions stored in one or more tangible, non-transitory, computer-readable media, such as memory 166, using processing circuitry, such as processor 168.

Accordingly, in some embodiments, the control system 164 may determine an expected mass flow rate from the compressor 74 based at least in part on characteristics of the components of the cooling system 114 (process block 182). The characteristics may include diameter of the oversized expansion valve 146, open cross-sectional area of the oversized expansion valve 146, diameters of the capillary expansion tubes 150, length of the capillary expansion tubes 150, open cross-sectional area of the capillary expansion tubes 150, target refrigerant distribution within the evaporator paths 154, and/or the like. Additionally, in some embodiments, the expected mass flow rate may be the refrigerant mass flow rate expected to be output from the compressor 74 when the compressor 74 is operated with an operating capacity at or above a threshold (e.g., 100% or maximum) operating capacity.

Additionally, the control system 164 may determine actual refrigerant mass flow rate from the compressor 74 (process block 184). As previously discussed, the control system 164 may receive sensor data from the one or more sensors 162 indicative of a measured refrigerant mass flow rate. Thus, based at least in part on the sensor data, the control system 164 may determine an expected refrigerant mass flow rate from the compressor 74.

The control system 164 may compare the actual refrigerant mass flow rate and the expected mass flow rate from the compressor 74 (decision block 186). When the actual refrigerant mass flow rate is not less than the expected refrigerant mass flow rate, the control system 164 may determine that the compressor 74 is expected to be operating at or above the threshold operating capacity and, thus, instruct the oversized expansion valve 146 to maintain its valve position at or above a threshold position (process block 88). For example, when the actual refrigerant mass flow rate is equal to the expected refrigerant mass flow rate, the control system 164 may determine that the compressor 74 is operating at 100% of its operating capacity. When the capillary expansion tubes 150 are sized for 100% operating capacity, the control system 164 may determine that refrigerant mass flow is expected to be choked and relatively uniformly distributed between the capillary expansion tubes 150 and, thus, instruct the actuator 174 to maintain the oversized expansion valve 146 in its fully open position.

On the other hand, when the actual refrigerant mass flow rate is less than the expected refrigerant mass flow rate, the control system 164 may determine that the compressor 74 is expected to be operating below the threshold operating capacity and, thus, instruct the oversized expansion valve 146 to adjust its valve position to an intermediate position (e.g., less than fully open and greater than fully closed) (process block 190). For example, when the actual refrigerant mass flow rate is less than the expected refrigerant mass flow rate, the control system 164 may determine that the compressor 74 is operating at less than 100% of its operating capacity. When the capillary expansion tubes 150 are sized for 100% operating capacity, the control system 164 may determine that likelihood of non-choked flow through the capillary expansion tubes 150 increase and/or of non-uniform refrigerant mass flow distribution between the capillary expansion tubes 150 increases. In some embodiments, the actual refrigerant mass flow rate may be less than the determined mass flow rate if a slowdown in a variable speed compressor occurs, if a shut off of a compressor of tandem compressors occurs, or in various other instances.

The control system 164 may determine the intermediate position of the oversized expansion valve 146 based at least in part on the expected mass flow rate. For example, the intermediate position may be the position that results in maintaining the expected refrigerant mass flow rate from the compressor 74. Therefore, the intermediate position of the oversized expansion valve 146 may be proportional to the expected mass flow rate. Additionally or alternatively, the control system 164 may determine the intermediate position of the oversized expansion valve 146 based at least in part on the difference between the expected mass flow rate of the refrigerant and a threshold mass flow rate. For example, if the expected mass flow determined based on the characteristics of the cooling system 114, as discussed above, is lower than the threshold mass flow rate, the intermediate position may be the position that results in maintaining the expected mass flow rate at or above the threshold mass flow rate. Therefore, the intermediate position of the oversized expansion valve 146 may be proportional to the difference between the determined expected mass flow rate and the threshold mass flow rate. Additionally or alternatively, the control system 164 may determine the intermediate position of the oversized expansion valve 146 based at least in part on the pressure drop and/or properties of the refrigerant across the oversized expansion valve 146. For example, the intermediate position of the oversized expansion valve 146 may be the position that may produce a pressure drop magnitude across the oversized expansion valve 146 that may cause, or may be expected to cause a decrease in subcooling of the refrigerant and/or an increase in flow quality of the refrigerant before entering the capillary expansion tubes 150 in order to decrease the choked flow rate across the capillary expansion tubes 150 while still maintaining choked flow.

As described above, partially closing (e.g., adjusting valve position to the intermediate position) the oversized expansion valve 146 may introduce or increase the pressure drop across the oversized expansion valve 146, which may control properties of the refrigerant to facilitate achieving relatively uniform refrigerant mass flow distribution. In particular, introducing or increasing the pressure drop across the oversized expansion valve 146 may decrease the subcooling and/or increase the flow quality of the refrigerant before the refrigerant enters the downstream capillary expansion tubes 150 to decrease the choked flow rate through the capillary expansion tubes 150. In this manner, the oversized expansion valve 146 is used to adjust properties of the refrigerant entering the capillary expansion tubes 150 to control the choked flow rate across the capillary expansion tubes 150.

In particular, the choked flow rate through the capillary expansion tubes 150 may be a function of the entering refrigerant properties. As such, the oversized expansion valve 146 may be controlled to facilitate approximately uniformly distributing refrigerant mass flow output from the condenser heat exchanger 76 between the multiple capillary expansion tubes 150 and, thus, the multiple evaporator paths 154 by changing the properties of the refrigerant entering the capillary expansion tubes 150 to maintain choked flow and simultaneously decrease the choked flow rate through the capillary expansion tubes 150. Conversely, as previously discussed, the oversized expansion valve 146 may be controlled to open farther such that the flow area is wider, or even to the threshold position, to change the properties of the refrigerant entering the capillary expansion tubes 150 to maintain choked flow and simultaneously increase the choked flow rate through the capillary expansion tubes 150. Thus, the control system 164 may control operation to facilitate maintaining the uniform refrigerant mass flow distribution in the evaporator paths 154 over various operating conditions of the compressor 74 using process 180.

Additionally or alternatively, in some embodiments, the control system 164 may determine refrigerant superheat entering the compressor 74, for example through a combination of pressure and temperature measurements of the refrigerant vapor entering the compressor 74 received via the one or more sensors 162. Superheat refers to vapor existing at a temperature above its normal boiling point. The control system 164 may determine an expected superheat of the refrigerant entering the compressor 74 based at least in part of characteristics of the components of the cooling system 114 and may determine actual refrigerant superheat of the refrigerant entering the compressor 74 based at least in part on the pressure and temperature measurements. The control system 164 may compare the actual superheat of the refrigerant entering the compressor 74 with the expected superheat of the refrigerant entering the compressor 74, and may control the valve position of the oversized valve 146 based at least in part on this comparison.

For example, when the actual superheat of the refrigerant entering the compressor 74 is not less than the expected superheat of the refrigerant entering the compressor 74, the control system 164 may determine that the compressor 74 is expected to be operating at or above the threshold operating capacity and, thus, instruct the oversized expansion valve 146 to maintain its position at or above the threshold position. On the other hand, when the actual superheat of the refrigerant entering the compressor 74 is less than the expected superheat, the control system 164 may determine that the compressor 74 is expected to be operating below the threshold operating capacity and, thus, instruct the oversized expansion valve 146 to adjust its valve position to an intermediate position (e.g., less than fully open and greater than fully closed).

The control system 164 may determine the intermediate position of the oversized valve 146 based at least in part on the expected superheat of the refrigerant entering the compressor 74. For example, the intermediate position may be the position that results in maintaining the expected superheat of the refrigerant entering the compressor 74. Therefore, the intermediate position of the oversized expansion valve 146 may be proportional to the expected superheat of the refrigerant entering the compressor 74. Additionally or alternatively, the control system 164 may determine the intermediate position of the oversized expansion valve 146 based at least in part of the difference between the expected superheat of the refrigerant entering the compressor 74 and a threshold superheat. Additionally or alternatively, the control system 164 may determine whether to increase or decrease the intermediate position of the oversized expansion valve 146 based at least in part on the difference between actual refrigerant superheat entering the compressor and the predetermined target superheat. For example, the control system 164 may increase the intermediate position of the oversized expansion valve 146 when the actual refrigerant superheat is higher than the predetermined target value, and the control system 164 may decrease the intermediate position of the oversized expansion valve 146 when the actual refrigerant superheat is lower than the predetermined target value.

Figure 7:
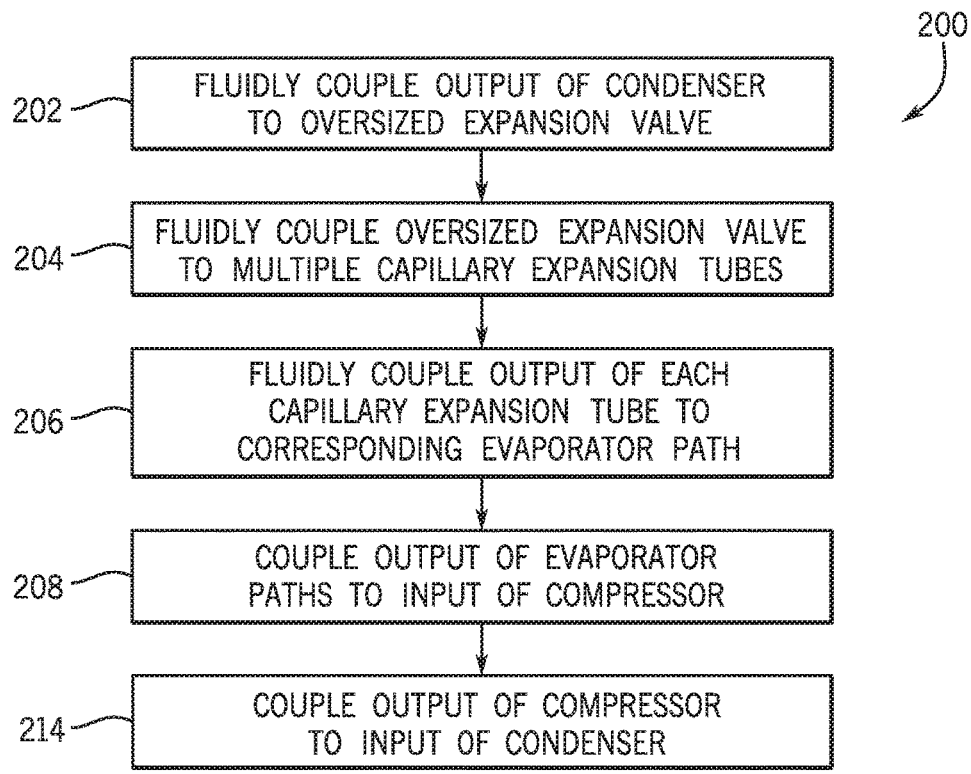
FIG. 7 is a flow diagram of a process for implementing at least a portion of the refrigerant loop of FIG. 5, in accordance with an embodiment of the present disclosure.

One embodiment of a process 200 for implementing at least a portion of a refrigerant loop 128 is described in FIG. 7. Generally, the process 200 includes fluidly coupling an output of a condenser to an input of an oversized expansion valve (process block 202), fluidly coupling an output of the oversized expansion valve to an input of multiple capillary expansion tubes (process block 204), and fluidly coupling an output of each of the multiple capillary expansion tubes to a corresponding evaporator coil (process block 206).

Thus, to implement the refrigerant loop 128 described above, the output of the condenser heat exchanger 76 may be fluidly coupled to the input of the oversized expansion valve 146 (process block 202). In some embodiments, a conduit may be fluidly coupled between the output of the condenser heat exchanger 76 and the input of the oversized expansion valve 146. As described above, the open cross-sectional area 148 of the oversized expansion valve 146 may be smaller than the open cross-sectional area of the conduit through which fluid flows from the condenser heat exchanger 76 to the oversized expansion valve 146. In some embodiments, the process 200 may be used with one or more additional processes for implementing the remainder of the refrigerant loop.

Additionally, the output of the oversized expansion valve 146 may be fluidly coupled to the inputs of multiple capillary expansion tubes 150 (process block 204). As described above, in some embodiment, a distributor 152 may be fluidly coupled between the output of the oversized expansion valve 146 and the inputs of multiple capillary expansion tubes 150, for example, to facilitate achieving relatively uniform refrigerant mass flow distribution when pressure drop across the oversized expansion valve causes the refrigerant to flash into two-phase flow. Additionally, in some embodiments, a conduit may be fluidly coupled between the output of the oversized expansion valve 146 and the inputs of multiple capillary expansion tubes 150. As described above, the capillary expansion tubes 150 may be lengths of tubing that have smaller open cross-sectional area than the upstream conduit.

Furthermore, the output of each capillary expansion tube 150 may be fluidly coupled to a corresponding one of multiple parallel evaporator paths 154 in the evaporator heat exchanger 80 (process block 206). Additionally, the output of the evaporator heat exchanger 80 may be fluidly coupled to the input of the compressor (process block 208) and the output of the compressor may be fluidly coupled to the input of the condenser (process block 214). As illustrated by the process 200, the present disclosure provides techniques for implementing at least a portion of a refrigerant loop 128 that may be controlled to facilitate achieving relatively uniform refrigerant mass flow distribution between multiple parallel evaporator paths 154 through various operating conditions and/or reducing likelihood of liquid refrigerant being circulated into the compressor 74. As described above, such a refrigerant loop may improve heat exchange efficiency of the evaporator heat exchanger 80, improve lifespan of the compressor 74, and/or improve operational reliability of the compressor 74.

Figure 8:
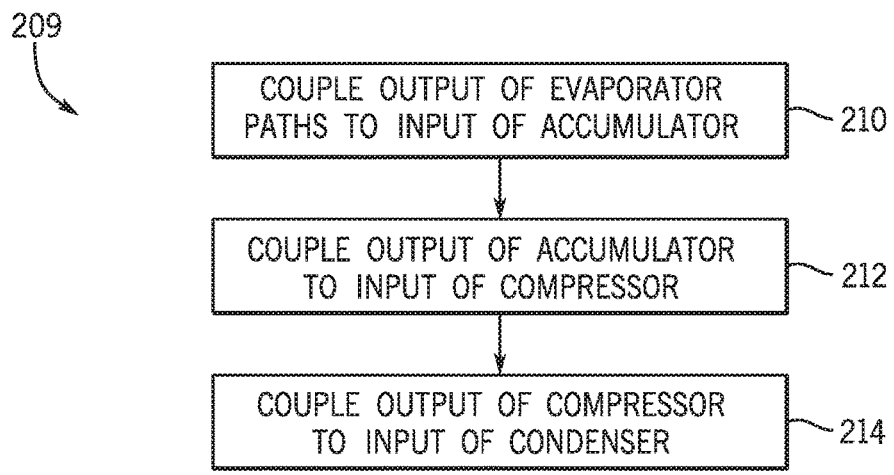
FIG. 8 is a flow diagram of another process for implementing at least a portion of the refrigerant loop of FIG. 5, in accordance with an embodiment of the present disclosure.

Another embodiment of a process 209 for implementing at least a portion of a refrigerant loop 128 is described in FIG. 8. Generally, the process 209 includes fluidly coupling an output of an evaporator heat exchanger to an input of an accumulator (process block 210) and fluidly coupling an output of the accumulator to an input of a compressor (process block 212). In some embodiments, the process 209 may be used with one or more additional processes for implementing the remainder of the refrigerant loop. For example, the process 209 may be used along with the process 200 of FIG. 4.

Thus, to implement the refrigerant loop 128 described above, the output of the evaporator heat exchanger 80 may be fluidly coupled to the accumulator 158 (process block 210). In some embodiments, the outputs of multiple parallel evaporator paths 154 may each be fluidly coupled to input of the accumulator 158. Additionally or alternatively, the outputs of the evaporator paths 154 may be fluidly coupled to a manifold 156, which is fluidly coupled to the input of the accumulator 158. As described above, the accumulator 158 may act as a liquid catcher to reduce likelihood of liquid refrigerant being supplied to the compressor 74.

Additionally, the output of the accumulator 158 may be fluidly coupled to an input of the compressor 74 (process block 212). In some embodiments, a conduit may be fluidly coupled between the output of the accumulator 158 and the input of the compressor 74. As illustrated by the process 209, the present disclosure provides techniques for implementing at least a portion of a refrigerant loop 128 that may reduce likelihood of liquid refrigerant being circulated into the compressor 74. As described above, such a refrigerant loop 128 may improve lifespan and/or operational reliability of the compressor 74.

Figure 9:
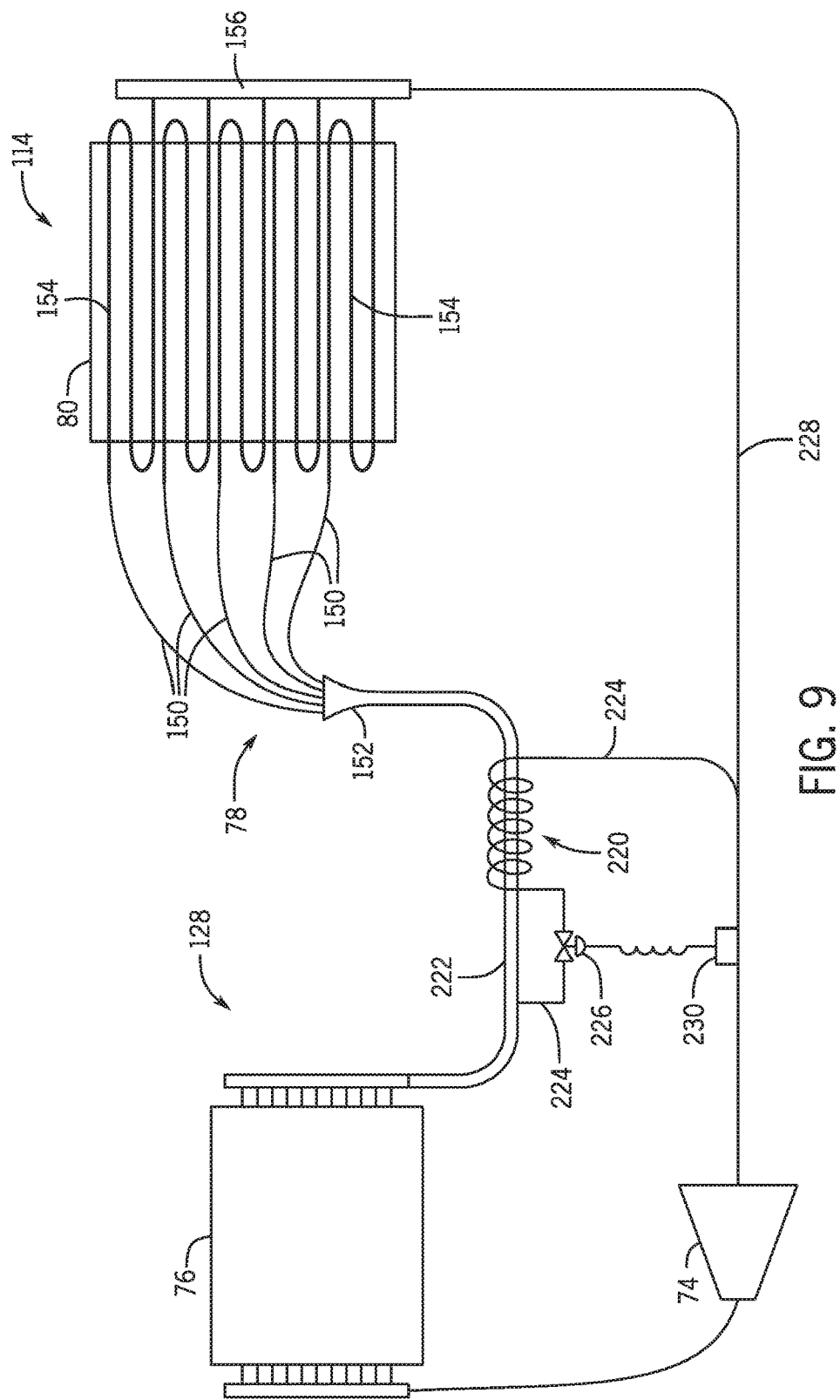
FIG. 9 is a schematic diagram of a refrigerant loop of a cooling system having a subcooling heat exchange assembly, in accordance with an embodiment of the present disclosure.

In some embodiments, the expansion device 78 may include the multiple parallel capillary expansion tubes 150, for example, without an oversized expansion valve 146. In such embodiments, an alternative means of changing the properties of the refrigerant entering the capillary expansion tubes 150 to control the choked flow rate of the refrigerant through the capillary expansion tubes 150 may be employed. FIG. 9 illustrates the cooling system 114 having a subcooling heat exchanger assembly 220 disposed along the refrigerant loop 128 between the condenser heat exchanger 76 and the parallel capillary expansion tubes 150. The subcooling heat exchanger assembly 220 may include two fluid streams and may control the properties of the refrigerant and, thus, the choked flow rate of the refrigerant through the capillary expansion tubes 150 by transferring heat between the two fluid streams.

The cooling system 114 includes the refrigerant loop 128, which circulates the refrigerant through the evaporator heat exchanger 80, the condenser heat exchanger 76 (e.g., condenser 76), the subcooling heat exchanger assembly 220, the capillary expansion tubes (e.g., expansion device 78), and the compressor 74, which drives (e.g., pumps) circulation of the refrigerant in the refrigerant loop 128. As previously discussed, the evaporator heat exchanger 80 may receive refrigerant output from the capillary expansion tubes 150, which may each output refrigerant to one or more evaporator paths 154 within the evaporator heat exchanger 80.

The subcooling heat exchanger assembly 220 may be disposed along the refrigerant loop 128 between the condenser heat exchanger 76 and the capillary expansion tubes 150 and, as such, the subcooling heat exchanger assembly 220 may receive refrigerant output from the condenser heat exchanger 76. The subcooling heat exchanger assembly 220 may include two fluid streams or lines, including a first fluid line 222 that includes the majority of the refrigerant flow out of the condenser heat exchanger 76 and a second fluid line 224 that includes a relatively small portion of the refrigerant flow out of the condenser heat exchanger 76. The output from the condenser heat exchanger 76 may be split such that a majority of the refrigerant output from the condenser heat exchanger 76 flows through the first fluid line 222 and a smaller portion of the refrigerant output from the condenser heat exchanger 76 flows through the second fluid line 224. In some embodiments, the first fluid line 222 may be an extension of an output conduit from the condenser heat exchanger 76.

Additionally, in some embodiments, the second fluid line 224 may branch off the output conduit and may coil around the first fluid line 222, for example, near the input to the capillary expansion tubes 150 and/or the distributor 152. The second fluid line 224 may coil around the first fluid line 222 a number of times (e.g., 2, 3, 4, 5, 6, 7, or more) to create a greater surface area for heat transfer between the first fluid line 222 and the second fluid line 224. Further, an expansion valve 226 may be fluidly coupled between the second fluid line 224 and the output conduit of the condenser heat exchanger 76. The expansion valve 226 may impart a pressure drop on the portion of the refrigerant flowing through the second fluid line 224, thereby reducing temperature of the refrigerant and/or concomitant vaporization of a portion of the refrigerant output from the expansion valve 226 before supply to a portion the second fluid line 224, which coils around the first fluid line 222.

In this manner, refrigerant flowing through the coiled portion of the second fluid line 224 may extract heat from the refrigerant flowing through the first fluid line 222. Therefore, reduction of the temperature of the refrigerant within the second fluid line 224 may drive the transfer of heat from the refrigerant within the first fluid line 222 through the portion of the subcooling heat exchange assembly 220 where the second fluid line 224 coils around the first fluid line 222, acting as a fluid line heat exchanger. As a result, the subcooling of the refrigerant flowing through the first fluid line 222 may be increased and the flow quality of the refrigerant flowing through the second fluid line 224 may be increased.

After heat transfer occurs between the liquid refrigerant flowing through the first fluid line 222 and the refrigerant flowing through the second fluid line 224, the refrigerant within the first fluid line 222 may flow into the capillary expansion tubes 150, for example, via the distributor 152. The second fluid line 224 may be coupled to a suction line 228 (e.g., between the output of the evaporator heat exchanger 80 and the input of the compressor 74). Therefore, the refrigerant flowing through the second fluid line 224 may be merged with the refrigerant output form the evaporator heat exchanger 80. Increasing the subcooling of the refrigerant within the first fluid line 222 before the refrigerant enters the capillary expansion tubes 150 may increase the choked flow rate of the refrigerant flow through the capillary expansion tubes 150. As such, the subcooling heat exchange assembly 220 may be used to maintain choked flow and to increase or decrease the choked mass flow rate through the parallel capillary expansion tubes 150 to facilitate a reduction in migration or redistribution of refrigerant mass within the refrigeration loop 128, which at least in some instance may facilitate maintaining uniform distribution of refrigerant mass flow through the capillary expansion tubes 150 and, thus, the evaporator paths 154 over a range of operation conditions.

The expansion valve 226 may be controlled to open or close (e.g., to increase or decrease the flow area of through the expansion valve 226) to increase or decrease the flow rate of the refrigerant flowing through the second fluid line 224. For example, the expansion valve 226 may be incrementally opened to increase the flow rate of the refrigerant flowing through the second fluid line 224. Conversely, the expansion valve 226 may be incrementally closed to decrease the flow rate of the refrigerant flowing through the second fluid line 226. As the rate of the refrigerant flowing through the expansion valve 226 and the second fluid line 224 is increased, the subcooling of the refrigerant flowing out of the first fluid line 222 into the capillary expansion tubes 150 is increased and, thus, the choked flow rate of the refrigerant through the capillary expansion tubes 150 is increased. As the rate of the refrigerant flowing through the expansion valve 226 and the second fluid line 224 is decreased, the increased subcooling of the refrigerant flowing out of the first fluid line 222 into the capillary expansion tubes 150 is decreased or stopped and, thus, the choked flow rate of the refrigerant through the capillary expansion tubes 150 is decreased.

In the illustrated embodiment, the expansion valve 226 is a thermostatic expansion valve (e.g., thermal expansion valve). The position of the expansion valve 226 may be controlled via a sensing bulb 230 disposed along the suction line 228. The sensing bulb 230 may be filled with refrigerant or a similar fluid and communicatively coupled to a spring within the expansion valve 226. As the temperature and pressure of the refrigerant output from the evaporator heat exchanger 80 changes (e.g., refrigerant within the suction line 228), the pressure within the bulb may change, causing a change in the pressure exerted on the spring within the expansion valve 226. The change in pressure on the spring may cause a change in the position of the expansion valve 226 (e.g., opening or closing), which, as described above, may increase or decrease the flow rate of the refrigerant flowing through the second fluid line 224.

In other embodiments, the expansion valve 226 may be an electric expansion valve controllable by a control system, for example, in a similar manner as the oversized expansion valve 146 and the control system 164 discussed above. For example, the control system may be communicatively coupled to one or more sensors disposed near the entrance to the compressor 74, similar to the sensing bulb 230. The one or more sensors may measure the temperature and pressure, or in some embodiments, the superheat, of the refrigerant entering the compressor 74 (e.g., refrigerant output from the evaporator heat exchanger 80 and/or refrigerant within the suction line 228). The one or more sensors may output the temperature and pressure measurements to the control system, and the control system may change the position of the expansion valve 226 based at least in part on the temperature and pressure of the refrigerant entering the compressor 74.

Control of the flow rate of the refrigerant flowing through the second fluid line 224 of the subcooling heat exchange assembly 220 and, thus, control of the subcooling of the refrigerant entering the capillary expansion tubes 150 may be used to increase or decrease the choked flow rate through the capillary expansion tubes 150 while maintaining choked flow. This may facilitate uniform distribution of refrigerant mass flow through the capillary expansion tubes 150 and, thus, uniform distribution of refrigerant mass flow through the evaporator paths 154 when compressor operation is varied. In this manner, operation may be controlled to facilitate improving operation of the cooling system 114.

Figure 10:
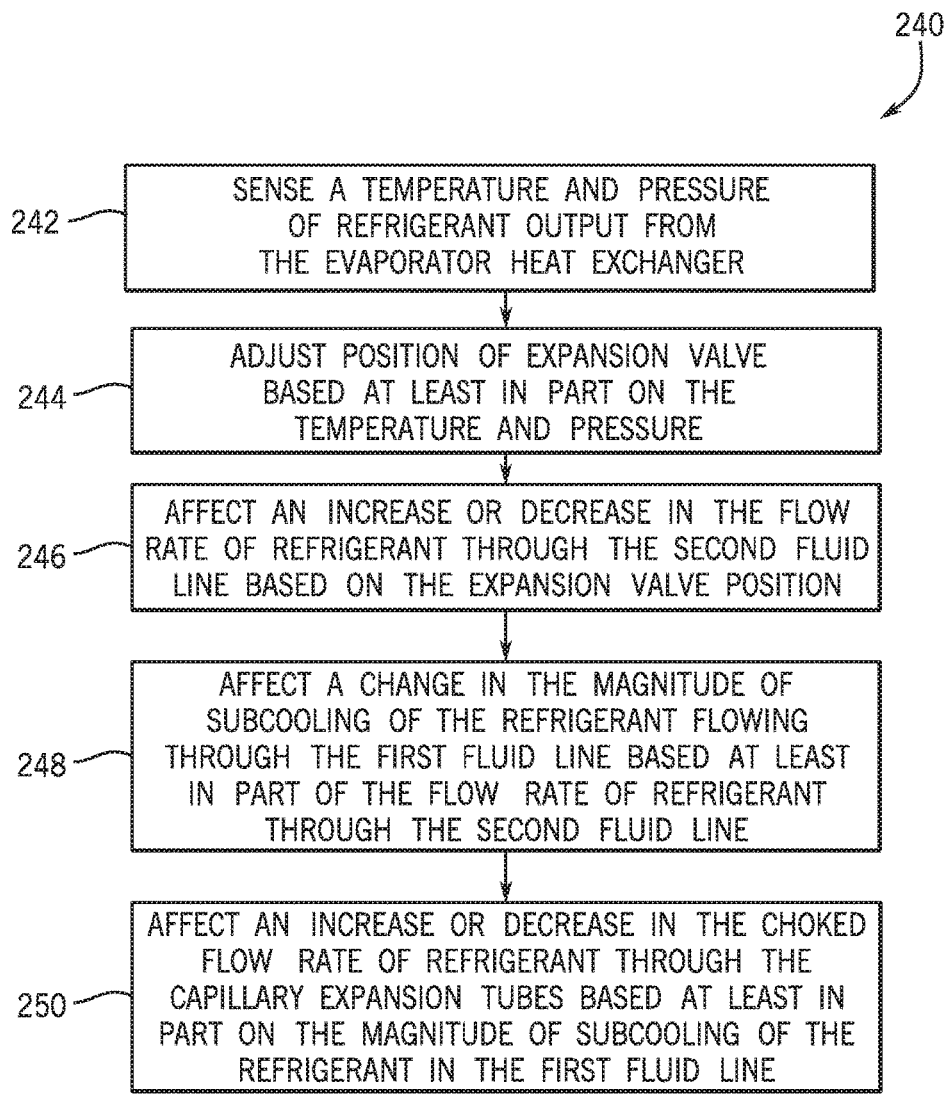
FIG. 10 is a flow diagram of a process for operating the refrigerant loop of FIG. 9, in accordance with an embodiment of the present disclosure.

To help illustrate, a process 240 for controlling operation of a cooling system 114, which includes a subcooling heat exchange assembly 220, is described in FIG. 10. Generally, the process 240 includes sensing temperature and pressure of refrigerant output from an evaporator heat exchanger (process block 242), adjusting valve position of the expansion valve based at least in part on the temperature and pressure (process block 244), affecting a change in flow rate of the refrigerant flowing through a second fluid line based at least in part on the valve position (process block 246), affecting a change in the subcooling of the refrigerant flowing through a first fluid line before the refrigerant enters capillary expansion tubes based at least in part on the flow rate (process block 248), and affecting the choked flow rate of the refrigerant flowing through the capillary expansion tubes based at in part on the subcooling of the refrigerant (process block 250). The process 240 may facilitate maintaining uniform refrigerant mass flow distribution through the parallel capillary expansion tubes 150 and, thus, through the evaporator paths 154 when operating capacity of the compressor 74 changes.

Accordingly, in some embodiments, a sensing bulb 230 coupled to an expansion valve 226 may sense a temperature and pressure of the refrigerant output from an evaporator heat exchanger 80 along a suction line 228 (process block 242). As temperature and pressure of the refrigerant output from the evaporator heat exchanger 80 increases, so does the pressure in the sensing bulb 230. As the temperature and pressure of the refrigerant output from the evaporator heat exchanger 80 decreases, so does the pressure in the sensing bulb 230. The temperature and pressure of the refrigerant output from the evaporator heat exchanger 80 may increase or decrease based at least in part on the operating capacity of the compressor 74. For example, if the flow into the condenser heat exchanger 76 is increased and higher than flow through the capillary expansion tubes 150, the refrigerant may spend more time within the evaporator paths 154 causing greater heat transfer from the surrounding fluid to the refrigerant, thereby increasing the temperature and pressure of the refrigerant output from the evaporator heat exchanger 80. The sensing bulb 230 may sense the increase in temperature and pressure of the refrigerant and the pressure within the sensing bulb 230 may increase.

A change in the pressure within the sensing bulb 230 may cause an adjustment of the position of the expansion valve 226 disposed along the second fluid line 224 of the subcooling heat exchange assembly 220 (process block 244). As described above, a change in pressure within the sensing bulb 230 may cause movement of the spring within the expansion valve 226 and, thus, an adjustment of the valve position to a more open position or a more closed position. In some embodiments, a threshold position of the expansion valve 226 may be approximately completely closed, such that there is no flow of refrigerant through the second fluid line 224 and the subcooling of the refrigerant entering the capillary expansion tubes 150 from the condenser heat exchanger 76 is relatively unchanged. Thus, if the sensing bulb 230 senses an increase in the temperature of the refrigerant along the suction line 228, the pressure within the sensing bulb 230 may increase, thereby causing the spring within the expansion valve 226 to adjust the valve position to an intermediate position greater than the threshold position (e.g., opening the expansion valve 226). The opposite may be true to adjust the valve position to a more closed position if the sensing bulb 230 senses a decrease in the temperature of the refrigerant along the suction line 228.

In some embodiments, as previously discussed, the expansion valve 226 may be an electric expansion valve. In such embodiments, a determination of a change in the temperature and/or pressure of the refrigerant along the suction line 228 may be made by the control system based on the pressure and temperature measurements received from the one or more sensors disposed along the suction line 228. If the control system determines that the temperature and pressure has changed, the control system may instruct the expansion valve 226 to adjust the valve position to a more open or a more closed position. As previously discussed, in some embodiments, a threshold position of the expansion valve 226 may be approximately completely closed, such that there is no flow of refrigerant through the second fluid line 224 and the subcooling of the refrigerant entering the capillary expansion tubes 150 from the condenser heat exchanger 76 is relatively unchanged. Thus, if the control system determines an increase in the temperature and pressure of the refrigerant along the suction line 228, the control system may instruct the expansion valve 226 to adjust the valve position to an intermediate position greater than the threshold position (e.g., opening the expansion valve 226). The opposite may be true to adjust the valve position to a more closed position if control system determines a decrease in the temperature and pressure of the refrigerant along the suction line 228.

Adjustment to the valve position of the expansion valve 226 may affect a change in the flow rate of refrigerant through the second fluid line 224 (process block 246). For example, opening of the expansion valve 226 greater than or from the threshold position may increase the flow rate of the refrigerant flowing through the second fluid line 224 as there is a larger flow area through the expansion valve 226. A change in the flow rate of the refrigerant flowing through the second fluid line 224 of the subcooling heat exchange assembly 220 may affect a change in the subcooling of the refrigerant flowing through the first fluid line 222 before the refrigerant enters the capillary expansion tubes 150 (process block 248). The expansion valve 226 may impart a pressure drop along the second fluid line 224, which decrease temperature of the refrigerant flowing through the second fluid line 224. When the expansion valve 226 is adjusted to a more open position increasing the flow rate of the refrigerant flowing through the second fluid line 224, more reduced temperature refrigerant may flow through the portion of the second fluid line 224 coiled around the first fluid line 222. Heat transfer along from the refrigerant flowing through the first fluid line 222 and the reduced temperature refrigerant flowing through the second fluid line 224 at the coiled portion may increase the subcooling of the refrigerant flowing through the first fluid line 222, which subsequently enters the capillary expansion tubes 150.

Change in the subcooling of the refrigerant in the first fluid line 222 before the refrigerant enters the capillary expansion tubes 150 may cause a change the choked flow rate of the refrigerant through the capillary expansion tubes 150 (process block 250). For example, increased subcooling of the refrigerant before the refrigerant enters the capillary expansion tubes 150 may increase the choked flow rate of the refrigerant through the capillary expansion tubes 150, facilitating maintenance of choked flow and uniform refrigerant mass flow distribution through the capillary expansion tubes 150 and, thus through the evaporator paths 154. The process 240 may also affect a decrease in the choked flow rate through the capillary expansion tubes 150 when the operating capacity of the compressor 74 is decreased. Thus, the subcooling heat exchange assembly may facilitate maintenance of choked flow and uniform refrigerant mass flow distribution through the evaporator coils through various operating conditions of the cooling system 114 and, thus, improve operation of the evaporator heat exchanger 80 and the cooling system 114.

Figure 11:
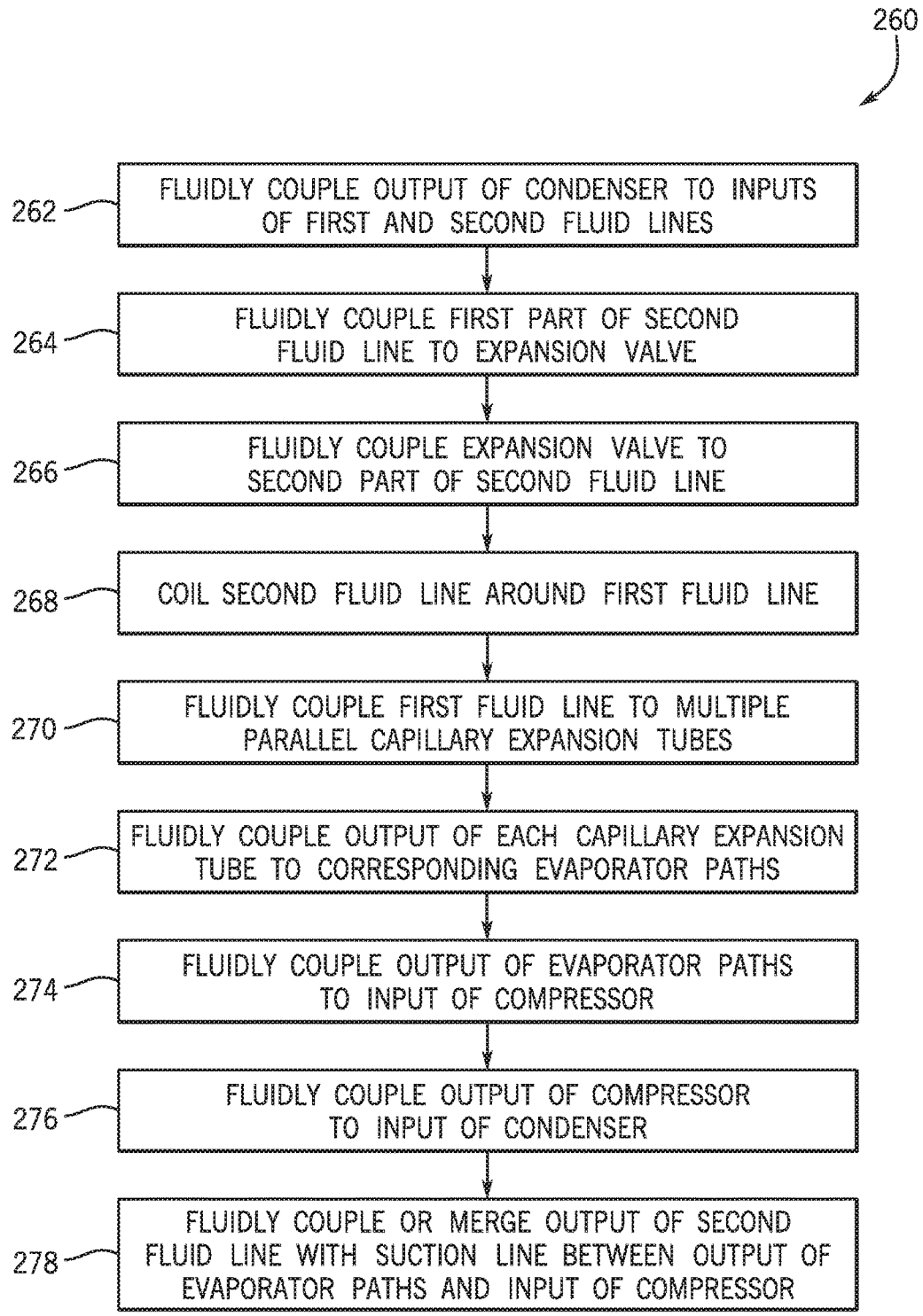
FIG. 11 is a flow diagram of a process for implementing the refrigerant loop of FIG. 9, in accordance with an embodiment of the present disclosure.

One embodiment of a process 260 for implementing at least a portion of a refrigerant loop 128, which includes a subcooling heat exchange assembly 220, is described in FIG. 11. Generally, the process 260 includes fluidly coupling an output of a condenser to inputs of a subcooling heat exchange assembly, fluidly coupling a first output of the subcooling heat exchange assembly to an input of multiple parallel capillary expansion tubes, fluidly coupling an output of each capillary expansion tube to a corresponding evaporator coil, and fluidly coupling a second output of the subcooling heat exchange assembly to a suction line between an output of a evaporator and an input of a compressor.

Thus, to implement the refrigerant loop 128 described above including the subcooling heat exchange assembly 220, the output of the condenser heat exchanger 76 may be fluidly coupled to a first input of a first fluid line 222 of the subcooling heat exchange assembly 220 and to a second input of a second fluid line 224 of the subcooling heat exchange assembly 220 (process block 262). In some embodiments, a conduit may be fluidly coupled between the output of the condenser heat exchanger 76 and the inputs of the first fluid line 222 and the second fluid line 224. As described above, the first fluid line 222 may include a majority of the refrigerant output from the condenser heat exchanger 76. Additionally, a first portion of the second fluid line 224 may be fluidly coupled to an expansion valve 226 (process block 264), and the expansion valve may be fluidly coupled to a second portion of the second fluid line 224 (process block 266). As previously discussed, valve position of the expansion valve 226 may be adjusted to control a flow rate of refrigerant through the second fluid line 224.

Additionally, the second portion of the second fluid line 224 may be coiled around the first fluid line 222 a number of times (process block 268). This coiled section may enable heat transfer between the refrigerant within the first fluid line 222 and the refrigerant within the second fluid line 224, for example, to affect the subcooling of the refrigerant before it enters the capillary expansion tubes 150. Additionally, the output of the first fluid line 222 may be fluidly coupled to the input of multiple parallel capillary expansion tubes 150 (process block 270). Furthermore, the output of each capillary expansion tube 150 may be fluidly coupled to a corresponding one of multiple parallel evaporator paths 154 in the evaporator heat exchanger 80 (process block 272). Additionally, the output of the evaporator heat exchanger 80 may be fluidly coupled to the input of the compressor 74 (process block 274) and the output of the compressor may be fluidly coupled to the input of the condenser 76 (process block 276). The output of the second portion of the second fluid line 224, after being coiled around the first fluid line 222, may be fluidly coupled, or merged, with the suction line 228 between the output of the evaporator heat exchanger 80 and the input of the compressor 74. Additionally or alternatively, in some embodiments, the subcooling heat exchange assembly 220, through which the fluid in the first fluid line 222 exchanges heat with the fluid in the second fluid line 224, may be any common type of heat exchanger, such as a plate heat exchanger, a shell and tube heat exchanger, or a concentric tube heat exchanger.

As illustrated by the process 260, the present disclosure provides techniques for implementing a refrigerant loop 128 having a subcooling heat exchange assembly 220, which may be controlled to facilitate achieving relatively uniform refrigerant mass flow distribution between multiple parallel evaporator paths 154 over various operating conditions and/or to reduce likelihood of liquid refrigerant being circulated into the compressor 74. As described above, such a refrigerant loop may improve heat exchange efficiency of the evaporator heat exchanger 80, improve lifespan of the compressor 74, and/or improve operational reliability of the compressor 74.

One or more of the disclosed embodiments, alone or in combination, may provide one or more technical effects useful to improve and/or maintain uniform distribution of the mass flow of the refrigerant through the multiple evaporator paths of a cooling system through various operating conditions of the compressor and, thus, improve operation of the cooling system. In general, some embodiments of the present disclosure include a cooling system having multiple parallel capillary expansion tubes and an adjustable oversized valve (e.g., electrical expansion valve), both fluidly coupled between the outlet of the condenser and the input of the evaporator paths of the evaporator. In some embodiments, the position of the oversized valve may be adjusted when the refrigerant mass flow rate from the compressor falls below a threshold capacity (e.g., 100% or maximum), introducing or increasing a pressure drop that may cause an decrease in the subcooling and/or an increase in the flow quality of the refrigerant before entering the capillary expansion tubes. Changing such properties of the refrigerant may decrease the choked flow rate through the capillary expansion tubes, thereby maintaining choked flow in the capillary expansion tubes even when sized for higher compressor capacity. In this manner, the oversized valve may be controlled to facilitate approximately uniformly distributing refrigerant mass flow output from the condenser between the multiple capillary expansion tubes and, thus, the multiple evaporator paths and/or multiple evaporator heat exchangers.

Additionally, the adjustable oversized valve and the choked nature of the flow through the capillary expansion tubes may protect the compressor from receiving liquid refrigerant. Adjusting the oversized valve position to less than the threshold position may result in the refrigerant beginning to vaporize before entering the evaporator paths, thus, reducing the likelihood of liquid refrigerant being output from the evaporator paths. This, in turn, may improve lifespan and/or operational reliability of the compressor. Additionally or alternatively, in some embodiments, the cooling system may include an accumulator (e.g. suction line accumulator) that may collect liquid refrigerant while passing vapor refrigerant to the compressor. In some embodiments, liquid refrigerant collected in the accumulator may backpressure refrigerant in the evaporator and reduce the flow rate enabling the refrigerant to absorb more heat before being out from the evaporator paths and, thus, reducing likelihood of liquid refrigerant being output from the evaporator paths. Accordingly, the oversized valve in combination with the multiple capillary expansion tubes that may be implemented such that they are "choked" and/or the accumulator may enable improved operation of the cooling system.

Other embodiments of the present disclosure include a cooling system having multiple parallel capillary expansion tubes and a subcooling heat exchange assembly, both fluidly coupled between the outlet of the condenser and the input of the evaporator paths of the evaporator. In some embodiments, the flow rate of refrigerant flowing through one of two fluid lines of the subcooling heat exchange assembly may be adjusted when operating capacity of the compressor changes, facilitating increased or decreased subcooling of refrigerant flowing through the other fluid line of the subcooling heat exchanger assembly before that refrigerant enters the capillary expansion tubes. Increasing or decreasing the subcooling of the refrigerant entering the capillary expansion tubes may cause an increase or decrease in the choke flow rate through the capillary expansion tubes, thereby maintaining choked flow in the capillary expansion tubes for various operating conditions of the compressor. In this manner, the subcooling heat exchange assembly may be facilitate approximately uniformly distributing refrigerant mass flow output from the condenser between the multiple capillary expansion tubes and, thus, the multiple evaporator paths during various operating capacities of the compressor. This may facilitate improving the operation of the evaporator and the cooling system as a whole.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:
1. A cooling system, comprising:
an expansion valve configured to exert a first pressure drop on refrigerant circulated through the cooling system;
a plurality of capillary expansion tubes fluidly coupled in parallel to an output of the expansion valve and configured to exert a second pressure drop on the refrigerant circulated through the cooling system; and
a controller communicatively coupled to the expansion valve, wherein the controller is configured to:
determine a magnitude of the first pressure drop across the expansion valve that is expected to decrease a mass flow of the refrigerant across the plurality of capillary expansion tubes while maintaining substan- tially uniform division of the refrigerant between the plurality of parallel capillary expansion tubes; and control the magnitude of the first pressure drop by instructing the expansion valve to adjust a position of the expansion valve based at least in part on a current position of the expansion valve, a measured refrigerant mass flow across the expansion valve, and refrigerant mass flow expected to be supplied to the expansion valve to facilitate substantially uniformly distributing the refrigerant mass flow between each of the plurality capillary expansion tubes.

2. The cooling system of claim 1, wherein the expansion valve comprises a first open cross-sectional area when the expansion valve is at a fully open position that is approximately equal to a second open cross-sectional area of a conduit to be fluidly coupled to an input of the expansion valve.

3. The cooling system of claim 1, comprising an evaporator heat exchanger fluidly coupled to the plurality of expansion tubes, wherein:

the evaporator heat exchanger comprises a plurality of evaporator paths;

each of the plurality of evaporator paths is fluidly coupled to a corresponding one of the plurality of capillary expansion tubes;

each of the plurality of evaporator paths is configured to facilitate heat exchange between the refrigerant circulated through the evaporator heat exchanger and a surrounding fluid; and the controller is configured to control magnitude of the first pressure drop across the expansion valve to facilitate substantially uniformly distributing the refrigerant mass flow between each of the plurality of evaporator paths.

4. The cooling system of claim 1, comprising a compressor configured to drive circulation of the refrigerant through the cooling system;

wherein the controller, to control magnitude of the first pressure drop, is configured to:

determine the refrigerant mass flow expected to be supplied to the expansion valve based at least in part on an operating capacity at which the compressor is expected to be operating;

instruct the expansion valve to decrease the valve position from a fully open position when the operating capacity is less than a threshold operating capacity; and instruct the expansion valve to maintain the valve position in the fully open position when the operating capacity is not less than the threshold operating capacity.

5. The cooling system of claim 4, wherein each of the plurality of capillary expansion tubes is sized to enable the expansion valve to substantially uniformly distribute the refrigerant mass flow between each of the plurality of capillary expansion tubes when:

the expansion valve is in the fully open position; and the operating capacity of the compressor is not less than the threshold operating capacity.

6. The cooling system of claim 4, comprising an accumulator fluidly coupled to an input of the compressor, wherein the accumulator comprises a reservoir configured to:

enable gas refrigerant to pass through the accumulator to the input of the compressor; and collect liquid refrigerant supplied to the accumulator to reduce likelihood of the liquid refrigerant being supplied to the compressor.

7. The cooling system of claim 4, wherein the compressor comprises a variable speed compressor or a plurality of tandem compressors.

8. The cooling system of claim 1, wherein:

the cooling system comprises a distributor fluidly coupled between the expansion valve and the plurality of capillary expansion tubes;

the expansion valve is configured to produce the first pressure drop to cause a decrease in subcooling of the refrigerant or an increase in flow quality of the refrigerant; and the distributor is configured to facilitate substantially uniformly distributing the refrigerant between each of the plurality capillary expansion tubes.

9. The cooling system of claim 1, comprising a sensor communicatively coupled to the controller, wherein:

the sensor is configured to generate sensor data based at least in part on measured refrigerant mass flow in the cooling system, speed of a motor driving a compressor in the cooling system, a number of tandem compressors operating in the cooling system, or any combination thereof; and the controller is configured to determine the refrigerant mass flow expected to be supplied to the expansion valve based at least in part on the sensor data.

10. The cooling system of claim 1, comprising a compressor configured to drive circulation of the refrigerant through the cooling system;

wherein the controller is configured to control magnitude of the first pressure drop based at least in part on superheat of the refrigerant expected to be supplied to the compressor, and is configured to:

determine the superheat of the refrigerant expected to be supplied to the compressor based at least in part on an operating capacity at which the compressor is expected to be operating;

instruct the expansion valve to decrease the valve position from a fully open position when the operating capacity is less than a threshold operating capacity; and instruct the expansion valve to maintain the valve position in the fully open position when the operating capacity is not less than the threshold operating capacity.

11. A method for operating a cooling system, comprising:

determining, using a controller of the cooling system, an expected mass flow of refrigerant to be supplied to an expansion valve in the cooling system as the refrigerant is circulated through the cooling system;

instructing, using the controller, an actuator of the expansion valve to maintain valve position at a first open position greater than or equal to a threshold position to produce a first pressure drop across the expansion valve that facilitates substantially uniformly dividing the refrigerant output from the expansion valve between a plurality of parallel capillary expansion tubes when the expected mass flow of refrigerant is greater than or equal to a threshold mass flow;

determining, using the controller, a second open position based at least in part on the valve position expected to enable the expansion valve to produce the first pressure drop with a pressure drop magnitude; and instructing, using the controller, the actuator to adjust the valve position from the first open position to the second open position less than the threshold position to produce a second pressure drop across the expansion valve that facilitates substantially uniformly dividing the refrigerant output from the expansion valve between the plurality of parallel capillary expansion tubes when the expected mass flow of refrigerant is less than the threshold mass flow, wherein the second pressure drop is greater than the first pressure drop.

12. The method of claim 11, wherein determining the expected mass flow of the refrigerant comprises:
determining an operating capacity at which a compressor that drives circulation of the refrigerant through the cooling system is expected to be operating; and
determining the expected mass flow of the refrigerant based at least in part on the operating capacity at which the compressor is expected to be operating.

13. The method of claim 12, wherein determining the operating capacity at which the compressor is expected to be operating comprises:
determining speed of a motor driving the compressor;
determining a number of compressors in operation when the compressor comprises a plurality of tandem compressors; and
determining the operating capacity at which the compressor is expected to be operating based at least in part on the speed of the motor, the number of compressors in operation, or both.

14. The method of claim 11, comprising determining, using the controller, the second open position based at least in part on difference between the expected mass flow of the refrigerant and the threshold mass flow when the expected mass flow of refrigerant is less than the threshold mass flow.

15. The method of claim 11, comprising determining, using the controller, a pressure drop magnitude across the expansion valve expected to decrease a mass flow of the refrigerant across the plurality of capillary expansion tubes while maintaining substantially uniform division of the refrigerant between the plurality of parallel capillary expansion tubes.

16. The method of claim 11, comprising:
determining, using the controller, a pressure drop magnitude across the expansion valve expected to enable the plurality of parallel capillary expansion tubes to produce a third pressure drop with a magnitude greater than the pressure drop magnitude; and
determining, using the controller, the second open position based at least in part on valve position expected to enable the expansion valve to produce the first pressure drop with the pressure drop magnitude.

17. The method of claim 11, comprising determining, using the controller, the threshold mass flow based at least in part on refrigerant mass flow expected to be output from a compressor of the cooling system when the compressor is operating at 100% operating capacity.

18. The method of claim 11, wherein:
instructing the actuator to maintain the valve position at the first open position comprises instructing the actuator to maintain the valve position at a fully open position; and
instructing the actuator to adjust the valve position from the first open position to the second open position comprises instructing the actuator to maintain the valve position less than the fully open position.

19. A tangible, non-transitory, computer-readable media that stores instructions executable by one or more processors in a cooling system, wherein the instructions comprise instructions to:
determine, using the one or more processors, an expected mass flow of refrigerant to be supplied to an expansion valve in the cooling system as the refrigerant is circulated through the cooling system;
instruct, using the one or more processors, an actuator of the expansion valve to maintain valve position at a first open position greater than or equal to a threshold position to produce a first pressure drop across the expansion valve with a first magnitude that facilitates substantially uniformly dividing the refrigerant output from the expansion valve between a plurality of parallel capillary expansion tubes when the expected mass flow of refrigerant is greater than or equal to a threshold mass flow;
determine, using the one or more processors, a second magnitude based at least in part on a pressure drop magnitude expected to decrease a mass flow rate of the refrigerant across the plurality of parallel capillary expansion tubes while maintaining substantially uniform division of the refrigerant output from the expansion valve between the plurality of capillary expansion tubes, and wherein the second magnitude is greater than the first magnitude;
determine, using the one or more processors, a second open position based at least in part on a valve position expected to enable the expansion valve to produce the first pressure drop with the second magnitude; and
instruct, using the using the one or more processors, the actuator to adjust the valve position from the first open position to the second open position less than the threshold position to produce the first pressure drop across the expansion valve with a second magnitude that facilitates substantially uniformly dividing the refrigerant output from the expansion valve between the plurality of parallel capillary expansion tubes when the expected mass flow of refrigerant is less than the threshold mass flow.

20. The tangible, non-transitory, computer-readable media of claim 19, wherein the instructions to determine the expected mass flow comprise instructions to:
determine an operating capacity at which a compressor that drives circulation of the refrigerant through the cooling system is expected to be operating; and
determine the expected mass flow of the refrigerant based at least in part on the operating capacity at which the compressor is expected to be operating.

21. The tangible, non-transitory, computer-readable media of claim 19, comprising instructions to determine, using the one or more processors, the second open position based at least in part on the expected mass flow of the refrigerant.

* * * * *